United States Patent
Zeng et al.

(10) Patent No.: US 9,985,826 B2
(45) Date of Patent: May 29, 2018

(54) SERVICE DATA OFFLOADING METHOD, ACCESS NETWORK DEVICE, AND TERMINAL

(71) Applicant: Huawei Technologies Co., Ltd., Shenzhen (CN)

(72) Inventors: Qinghai Zeng, Shanghai (CN); Jian Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 114 days.

(21) Appl. No.: 14/939,924

(22) Filed: Nov. 12, 2015

(65) Prior Publication Data

US 2016/0072668 A1 Mar. 10, 2016

Related U.S. Application Data

(63) Continuation of application No. PCT/CN2013/075803, filed on May 17, 2013.

(51) Int. Cl.
*H04L 12/24* (2006.01)
*H04W 28/08* (2009.01)
(Continued)

(52) U.S. Cl.
CPC ......... *H04L 41/0803* (2013.01); *H04W 28/08* (2013.01); *H04W 28/085* (2013.01);
(Continued)

(58) Field of Classification Search
CPC ... H04W 28/08; H04W 28/085; H04W 72/12; H04W 84/12; H04W 88/02; H04L 41/0803

See application file for complete search history.

(56) References Cited

U.S. PATENT DOCUMENTS

2010/0091653 A1 4/2010 Koodli et al.
2013/0114494 A1 5/2013 Yuk et al.
(Continued)

FOREIGN PATENT DOCUMENTS

CN 101998548 A 3/2011
CN 102065556 A 5/2011
(Continued)

OTHER PUBLICATIONS

LTE, "3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 v11.3.0, Mar. 2013, 344 pages.

*Primary Examiner* — Jae Y Lee
(74) *Attorney, Agent, or Firm* — Slater Matsil, LLP

(57) ABSTRACT

A service data offloading method, an access network device, and a terminal are provided. The access network device sends a local area network configuration message and a bearer configuration message to the terminal, configures a local area network for the terminal according to the local area network configuration message, and configures a dedicated bearer for the terminal according to the bearer configuration message, where the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

14 Claims, 11 Drawing Sheets

(51) Int. Cl.
*H04W 72/12* (2009.01)
*H04W 84/12* (2009.01)
*H04W 88/02* (2009.01)

(52) U.S. Cl.
CPC ............ *H04W 72/12* (2013.01); *H04W 84/12* (2013.01); *H04W 88/02* (2013.01)

(56) References Cited

U.S. PATENT DOCUMENTS

| | | | |
|---|---|---|---|
| 2014/0082697 A1 | 3/2014 | Watfa et al. | |
| 2015/0099501 A1* | 4/2015 | Kim .................. | H04W 52/0216 455/418 |
| 2015/0139192 A1* | 5/2015 | Zhang .................. | H04W 36/04 370/331 |
| 2015/0181593 A1* | 6/2015 | Kim .................. | H04W 52/0216 370/329 |

FOREIGN PATENT DOCUMENTS

| | | |
|---|---|---|
| CN | 102083213 A | 6/2011 |
| CN | 102083224 A | 6/2011 |
| CN | 102447549 A | 5/2012 |
| CN | 104641718 A | 5/2015 |
| EP | 2709418 A2 | 3/2014 |
| EP | 2744260 A1 | 6/2014 |
| EP | 2896265 A1 | 7/2015 |
| WO | 2011157129 A2 | 12/2011 |
| WO | 2013034052 A1 | 3/2013 |
| WO | 2013040028 A2 | 3/2013 |
| WO | 2014043494 A1 | 3/2014 |

* cited by examiner

SERVICE DATA OFFLOADING METHOD, ACCESS NETWORK DEVICE, AND TERMINAL

This application is a continuation of International Application No. PCT/CN2013/075803, filed on May 17, 2013, which is hereby incorporated by reference in its entirety.

TECHNICAL FIELD

The present invention relates to the field of communications, and in particular, to a service data offloading method, an access network device, and a terminal.

BACKGROUND

The wireless local access network (WLAN) is a point-to-multipoint communications system, that is, one access point (AP) communicates with multiple terminal stations (STA). In WLAN communications, mainly a channel contention mechanism is used. The STA listens on a channel before sending data, and sends the data or a request message to the WLAN network once finding that the channel is not occupied by others. It is likely that multiple STAs and multiple APs simultaneously listen on a channel and simultaneously send data or a request message to the WLAN network, and therefore, a sending conflict is caused. In this case, the WLAN decentralizes contention by using a backoff window mechanism, to reduce a conflict probability. However, as a quantity of users that access the WLAN network increases, the contention conflict probability dramatically rises; and an increasing quantity of users sends uplink data and receives downlink data via the WLAN network, resulting in reduction of data transmission efficiency in the WLAN network.

SUMMARY

Embodiments provide a service data offloading method, an access network device, and a terminal, which can reduce a contention conflict probability and improve network transmission efficiency.

A first aspect of the embodiments provides a service data offloading method, including: sending, by an access network device, a local area network configuration message and a bearer configuration message to a terminal, configuring a local area network for the terminal according to the local area network configuration message, and configuring a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

With reference to the first aspect of the embodiments, in a first implementation manner of the first aspect of the embodiments, the method includes the access network device is a radio access network device and the local area network is a wireless local area network WLAN network.

With reference to the first aspect of the embodiments, or the first implementation manner of the first aspect, in a second implementation manner of the first aspect of the embodiments, when the local area network configuration message includes the downlink-only data reception indication, the step of sending, by an access network device, a local area network configuration message to a terminal and configuring a local area network for the terminal according to the local area network configuration message specifically includes sending, by the radio access network device, an assisted cell addition message or an assisted cell modification message to the terminal, where the assisted cell addition message or the assisted cell modification message includes a downlink-only WIFI indication; and adding, by the radio access network device, a first WLAN network for the terminal according to the assisted cell addition message, or modifying a second WLAN network for the terminal according to the assisted cell modification message, where the downlink-only WIFI indication indicates that the first WLAN network or the second WLAN network is downlink-only, so that the terminal receives, in the first WLAN network or the second WLAN network, downlink data and prohibits sending uplink data.

With reference to the first aspect of the embodiments, or the first implementation manner of the first aspect, or the second implementation manner of the first aspect, in a third implementation manner of the first aspect of the embodiments, the step of sending, by an access network device, a bearer configuration message to a terminal and configuring a dedicated bearer for the terminal according to the bearer configuration message specifically includes sending, by the radio access network device, a dedicated radio bearer configuration message to the terminal; and configuring, by the radio access network device, at least one first dedicated radio bearer for the terminal according to the dedicated radio bearer configuration message, where the dedicated radio bearer configuration message includes an identifier of the first WLAN network associated with the first dedicated radio bearer, so that the terminal only receives downlink data of the first dedicated radio bearer in the first WLAN network according to the downlink-only WIFI indication and the identifier of the first WLAN network.

With reference to the first aspect of the embodiments, or the first implementation manner of the first aspect, or the second implementation manner of the first aspect, in a fourth implementation manner of the first aspect of the embodiments, the step of sending, by an access network device, a bearer configuration message to a terminal and configuring a dedicated bearer for the terminal according to the bearer configuration message specifically includes sending, by the radio access network device, a dedicated radio bearer configuration message to the terminal; and configuring, by the radio access network device, at least one second dedicated radio bearer for the terminal according to the dedicated radio bearer configuration message, where the dedicated radio bearer configuration message includes an identifier of the second WLAN network associated with the second dedicated radio bearer, so that the terminal only receives downlink data of the second dedicated radio bearer in the second WLAN network according to the downlink-only WIFI indication and the identifier of the second WLAN network.

With reference to the first aspect of the embodiments, or the first implementation manner of the first aspect, or the second implementation manner of the first aspect, in a fifth implementation manner of the first aspect of the embodiments, the step of sending, by an access network device, a bearer configuration message to a terminal and configuring a dedicated bearer for the terminal according to the bearer configuration message specifically includes using the first WLAN network as a first assisted cell; sending, by the radio access network device, a dedicated radio bearer configuration message to the terminal; and configuring, by the radio access network device, at least one third dedicated radio bearer for the terminal according to the dedicated radio bearer configuration message, where the dedicated radio bearer configuration message includes a number indication of an assisted cell associated with the third dedicated radio bearer, so that the terminal only receives downlink data of the third dedicated radio bearer in the first assisted cell according to the downlink-only WIFI indication and the number indication of the assisted cell.

With reference to the first aspect of the embodiments, or the first implementation manner of the first aspect, or the second implementation manner of the first aspect, in a sixth implementation manner of the first aspect of the embodiments, the step of sending, by an access network device, a bearer configuration message to a terminal and configuring a dedicated bearer for the terminal according to the bearer configuration message specifically includes using the second WLAN network as a second assisted cell; sending, by the radio access network device, a dedicated radio bearer configuration message to the terminal; and configuring, by the radio access network device, at least one fourth dedicated radio bearer for the terminal according to the dedicated radio bearer configuration message, where the dedicated radio bearer configuration message includes a number indication of an assisted cell associated with the fourth dedicated radio bearer, so that the terminal only receives downlink data of the fourth dedicated radio bearer in the second assisted cell according to the downlink-only WIFI indication and the number indication of the assisted cell.

With reference to the first aspect of the embodiments, or the first implementation manner of the first aspect, in a seventh implementation manner of the first aspect of the embodiments, when the bearer configuration message includes the downlink-only data reception indication, the step of sending, by an access network device, a local area network configuration message to a terminal and configuring a local area network for the terminal according to the local area network configuration message specifically includes sending, by the radio access network device, an assisted cell addition message or an assisted cell modification message to the terminal, where the assisted cell addition message or the assisted cell modification message includes a WIFI indication; and adding, by the radio access network device, a third WLAN network for the terminal according to the assisted cell addition message including the WIFI indication, or modifying a fourth WLAN network for the terminal according to the assisted cell modification message including the WIFI indication, where the WIFI indication indicates that an added assisted cell or a modified assisted cell is a WLAN network.

With reference to the first aspect of the embodiments, or the first implementation manner of the first aspect, or the seventh implementation manner of the first aspect, in an eighth implementation manner of the first aspect of the embodiments, the step of sending, by an access network device, a bearer configuration message to a terminal and configuring a dedicated bearer for the terminal according to the bearer configuration message specifically includes sending, by the radio access network device, a dedicated radio bearer configuration message to the terminal; and configuring, by the radio access network device, at least one fifth dedicated radio bearer for the terminal according to the dedicated radio bearer configuration message, where the dedicated radio bearer configuration message includes an identifier of the third WLAN network associated with the fifth dedicated radio bearer and a downlink-only WIFI indication, so that the terminal only receives downlink data of the fifth dedicated radio bearer in the third WLAN network according to the downlink-only WIFI indication and the identifier of the third WLAN network; and the downlink-only WIFI indication indicates that the fifth dedicated radio bearer is downlink-only, so that the terminal receives the downlink data of the fifth dedicated radio bearer and prohibits sending uplink data of the fifth dedicated radio bearer.

With reference to the first aspect of the embodiments, or the first implementation manner of the first aspect, or the seventh implementation manner of the first aspect, in a ninth implementation manner of the first aspect of the embodiments, the step of sending, by an access network device, a bearer configuration message to a terminal and configuring a dedicated bearer for the terminal according to the bearer configuration message specifically includes sending, by the radio access network device, a dedicated radio bearer configuration message to the terminal; and configuring, by the radio access network device, at least one sixth dedicated radio bearer for the terminal according to the dedicated radio bearer configuration message, where the dedicated radio bearer configuration message includes an identifier of the fourth WLAN network associated with the sixth dedicated radio bearer and a downlink-only WIFI indication, so that the terminal only receives downlink data of the sixth dedicated radio bearer in the fourth WLAN network according to the downlink-only WIFI indication and the identifier of the fourth WLAN network; and the downlink-only WIFI indication indicates that the sixth dedicated radio bearer is downlink-only, so that the terminal receives the downlink data of the sixth dedicated radio bearer and prohibits sending uplink data of the sixth dedicated radio bearer.

With reference to the first aspect of the embodiments, or the first implementation manner of the first aspect, or the seventh implementation manner of the first aspect, in a tenth implementation manner of the first aspect of the embodiments, the step of sending, by an access network device, a bearer configuration message to a terminal and configuring a dedicated bearer for the terminal according to the bearer configuration message specifically includes using the third WLAN network as a third assisted cell; sending, by the radio access network device, a dedicated radio bearer configuration message to the terminal; and configuring, by the radio access network device, at least one seventh dedicated radio bearer for the terminal according to the dedicated radio bearer configuration message, where the dedicated radio bearer configuration message includes a number indication of an assisted cell associated with the seventh dedicated radio bearer and a downlink-only WIFI indication, so that the terminal only receives downlink data of the seventh dedicated radio bearer in the third assisted cell according to the downlink-only WIFI indication and the number indication of the assisted cell; and the downlink-only WIFI indication indicates that the seventh dedicated radio bearer is downlink-only, so that the terminal receives the downlink data of the seventh dedicated radio bearer and prohibits sending uplink data of the seventh dedicated radio bearer.

With reference to the first aspect of the embodiments, or the first implementation manner of the first aspect, or the seventh implementation manner of the first aspect, in an eleventh implementation manner of the first aspect of the embodiments, the step of sending, by an access network device, a bearer configuration message to a terminal and configuring a dedicated bearer for the terminal according to the bearer configuration message specifically includes: using the fourth WLAN network as a fourth assisted cell; sending, by the radio access network device, a dedicated radio bearer configuration message to the terminal; and configuring, by the radio access network device, at least one eighth dedicated radio bearer for the terminal according to the dedicated radio bearer configuration message, where the dedicated radio bearer configuration message includes a number indication of an assisted cell associated with the eighth dedicated radio bearer and a downlink-only WIFI indication, so that the terminal only receives downlink data of the eighth dedicated radio bearer in the fourth assisted cell according to the downlink-only WIFI indication and the number indication of the assisted cell; and the downlink-only WIFI indication indicates that the eighth dedicated radio bearer is downlink-only, so that the terminal receives the downlink data of the eighth dedicated radio bearer and prohibits sending uplink data of the eighth dedicated radio bearer.

With reference to the first aspect of the embodiments, or the first implementation manner of the first aspect, or the second implementation manner of the first aspect, or the third implementation manner of the first aspect, or the fourth implementation manner of the first aspect, or the fifth implementation manner of the first aspect, or the sixth implementation manner of the first aspect, or the seventh implementation manner of the first aspect, or the eighth implementation manner of the first aspect, or the ninth implementation manner of the first aspect, or the tenth implementation manner of the first aspect, or the eleventh implementation manner of the first aspect, in a twelfth implementation manner of the first aspect of the embodiments, before the step of sending, by an access network device, a local area network configuration message and a bearer configuration message to a terminal, configuring a local area network for the terminal according to the local area network configuration message, and configuring a dedicated bearer for the terminal according to the bearer configuration message, the method further includes determining, by the access network device according to a terminal service status, a network load status, or a network channel quality status, whether to configure the local area network for the terminal; and if it is determined to configure the local area network for the terminal, executing the sending of the local area network configuration message to the terminal.

With reference to the first aspect of the embodiments, or the first implementation manner of the first aspect, or the second implementation manner of the first aspect, or the third implementation manner of the first aspect, or the fourth implementation manner of the first aspect, or the fifth implementation manner of the first aspect, or the sixth implementation manner of the first aspect, or the seventh implementation manner of the first aspect, or the eighth implementation manner of the first aspect, or the ninth implementation manner of the first aspect, or the tenth implementation manner of the first aspect, or the eleventh implementation manner of the first aspect, in a thirteenth implementation manner of the first aspect of the embodiments, after the step of receiving, by the terminal, downlink data of the dedicated bearer and prohibiting sending uplink data of the dedicated bearer in the local area network according to a downlink-only data reception indication, where the local area network configuration message or the bearer configuration message includes the downlink-only data reception indication, the method further includes receiving, by the access network device, an acknowledge frame sent by the terminal, to give a feedback that the terminal successfully receives the downlink data.

A second aspect of the embodiments provides a service data offloading method, including receiving, by a terminal, a local area network configuration message sent by an access network device and learning a local area network configured by the access network device, and receiving a bearer configuration message sent by the access network device and learning a dedicated bearer configured by the access network device, where the local area network is associated with the dedicated bearer; and receiving, by the terminal according to a downlink-only data reception indication included in the local area network configuration message or in the bearer configuration message, downlink data of the dedicated bearer and prohibiting sending uplink data of the dedicated bearer in the local area network associated with the dedicated bearer.

With reference to the second aspect of the embodiments, in a first implementation manner of the second aspect of the embodiments, the method includes the access network device is a radio access network device, the local area network is a wireless local area network WLAN network, and the dedicated bearer is a dedicated radio bearer.

With reference to the second aspect of the embodiments, or the first implementation manner of the second aspect, in a second implementation manner of the second aspect of the embodiments, after the step of receiving, by the terminal according to a downlink-only data reception indication included in the local area network configuration message or in the bearer configuration message, downlink data of the dedicated bearer and prohibiting sending uplink data of the dedicated bearer in the local area network associated with the dedicated bearer, the method further includes: sending, by the terminal to the access network device, an acknowledge frame indicating a downlink data reception success.

A third aspect of the embodiments provides an access network device, including a first execution unit, configured to send a local area network configuration message to a terminal and configure a local area network for the terminal according to the local area network configuration message; and a second execution unit, configured to send a bearer configuration message to the terminal and configure a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

With reference to the third aspect of the embodiments, in a first implementation manner of the third aspect of the embodiments, the local area network is a wireless local area network WLAN network.

With reference to the third aspect of the embodiments, or the first implementation manner of the third aspect, in a second implementation manner of the third aspect of the embodiments, when the local area network configuration message includes the downlink-only data reception indication, the first execution unit includes a first sending module, configured to send an assisted cell addition message or an assisted cell modification message to the terminal, where the assisted cell addition message or the assisted cell modification message includes a downlink-only WIFI indication; and a first configuration module, configured to add a first WLAN network for the terminal according to the assisted cell addition message, or modify a second WLAN network for the terminal according to the assisted cell modification message, where the downlink-only WIFI indication indicates that the first WLAN network or the second WLAN network is downlink-only, so that the terminal receives, in the first WLAN network or the second WLAN network, downlink data and prohibits sending uplink data.

With reference to the third aspect of the embodiments, or the first implementation manner of the third aspect, or the second implementation manner of the third aspect, in a third implementation manner of the third aspect of the embodiments, the second execution unit includes: a second sending module, configured to send a dedicated radio bearer configuration message to the terminal; and a second configuration module, configured to configure at least one first dedicated radio bearer for the terminal according to the dedicated radio bearer configuration message, where the dedicated radio bearer configuration message includes an identifier of the first WLAN network associated with the first dedicated radio bearer, so that the terminal only receives downlink data of the first dedicated radio bearer in the first WLAN network according to the downlink-only WIFI indication and the identifier of the first WLAN network.

With reference to the third aspect of the embodiments, or the first implementation manner of the third aspect, or the second implementation manner of the third aspect, in a fourth implementation manner of the third aspect of the embodiments, the second execution unit includes: a third sending module, configured to send a dedicated radio bearer configuration message to the terminal; and a third configuration module, configured to configure at least one second dedicated radio bearer for the terminal according to the dedicated radio bearer configuration message, where the dedicated radio bearer configuration message includes an identifier of the second WLAN network associated with the second dedicated radio bearer, so that the terminal only receives downlink data of the second dedicated radio bearer in the second WLAN network according to the downlink-only WIFI indication and the identifier of the second WLAN network.

With reference to the third aspect of the embodiments, or the first implementation manner of the third aspect, or the second implementation manner of the third aspect, in a fifth implementation manner of the third aspect of the embodiments, the second execution unit includes: the first WLAN network is used as a first assisted cell; a fourth sending module, configured to send a dedicated radio bearer configuration message to the terminal; and a fourth configuration module, configured to configure at least one third dedicated radio bearer for the terminal according to the dedicated radio bearer configuration message, where the dedicated radio bearer configuration message includes a number indication of an assisted cell associated with the third dedicated radio bearer, so that the terminal only receives downlink data of the third dedicated radio bearer in the first assisted cell according to the downlink-only WIFI indication and the number indication of the assisted cell.

With reference to the third aspect of the embodiments, or the first implementation manner of the third aspect, or the second implementation manner of the third aspect, in a sixth implementation manner of the third aspect of the embodiments, the second execution unit includes: the second WLAN network is used as a second assisted cell; a fifth sending module, configured to send a dedicated radio bearer configuration message to the terminal; and a fifth configuration module, configured to configure at least one fourth dedicated radio bearer for the terminal according to the dedicated radio bearer configuration message, where the dedicated radio bearer configuration message includes a number indication of an assisted cell associated with the fourth dedicated radio bearer, so that the terminal only receives downlink data of the fourth dedicated radio bearer in the second assisted cell according to the downlink-only WIFI indication and the number indication of the assisted cell.

With reference to the third aspect of the embodiments, or the first implementation manner of the third aspect, in a seventh implementation manner of the third aspect of the embodiments, when the bearer configuration message includes the downlink-only data reception indication, the first execution unit includes a sixth sending module, configured to send an assisted cell addition message or an assisted cell modification message to the terminal, where the assisted cell addition message or the assisted cell modification message includes a WIFI indication; and a sixth configuration module, configured to add a third WLAN network for the terminal according to the assisted cell addition message including the WIFI indication, or modify a fourth WLAN network for the terminal according to the assisted cell modification message including the WIFI indication, where the WIFI indication indicates that an added assisted cell or a modified assisted cell is a WLAN network.

With reference to the third aspect of the embodiments, or the third implementation manner of the third aspect, or the seventh implementation manner of the third aspect, in an eighth implementation manner of the third aspect of the embodiments, the second execution unit includes: a seventh sending module, configured to send a dedicated radio bearer configuration message to the terminal; and a seventh configuration module, configured to configure at least one fifth dedicated radio bearer for the terminal according to the dedicated radio bearer configuration message, where the dedicated radio bearer configuration message includes an identifier of the third WLAN network associated with the fifth dedicated radio bearer and a downlink-only WIFI indication, so that the terminal only receives downlink data of the fifth dedicated radio bearer in the third WLAN network according to the downlink-only WIFI indication and the identifier of the third WLAN network; and the downlink-only WIFI indication indicates that the fifth dedicated radio bearer is downlink-only, so that the terminal receives the downlink data of the fifth dedicated radio bearer and prohibits sending uplink data of the fifth dedicated radio bearer.

With reference to the third aspect of the embodiments, or the third implementation manner of the third aspect, or the seventh implementation manner of the third aspect, in a ninth implementation manner of the third aspect of the embodiments, the second execution unit includes: an eighth sending module, configured to send a dedicated radio bearer configuration message to the terminal; and an eighth configuration module, configured to configure at least one sixth dedicated radio bearer for the terminal according to the dedicated radio bearer configuration message, where the dedicated radio bearer configuration message includes an identifier of the fourth WLAN network associated with the sixth dedicated radio bearer and a downlink-only WIFI indication, so that the terminal only receives downlink data of the sixth dedicated radio bearer in the fourth WLAN network according to the downlink-only WIFI indication and the identifier of the fourth WLAN network; and the downlink-only WIFI indication indicates that the sixth dedicated radio bearer is downlink-only, so that the terminal receives the downlink data of the sixth dedicated radio bearer and prohibits sending uplink data of the sixth dedicated radio bearer.

With reference to the third aspect of the embodiments, or the third implementation manner of the third aspect, or the seventh implementation manner of the third aspect, in a tenth implementation manner of the third aspect of the embodiments, the second execution unit includes the third WLAN network is used as a third assisted cell; a ninth sending module, configured to send a dedicated radio bearer configuration message to the terminal; and a ninth configuration module, configured to configure at least one seventh dedicated radio bearer for the terminal according to the dedicated radio bearer configuration message, where the dedicated radio bearer configuration message includes a number indication of an assisted cell associated with the seventh dedicated radio bearer and a downlink-only WIFI indication, so that the terminal only receives downlink data of the seventh dedicated radio bearer in the third assisted cell according to the downlink-only WIFI indication and the number indication of the assisted cell; and the downlink-only WIFI indication indicates that the seventh dedicated radio bearer is downlink-only, so that the terminal receives the downlink data of the seventh dedicated radio bearer and prohibits sending uplink data of the seventh dedicated radio bearer.

With reference to the third aspect of the embodiments, or the third implementation manner of the third aspect, or the seventh implementation manner of the third aspect, in an eleventh implementation manner of the third aspect of the embodiments, the second execution unit includes the fourth WLAN network is used as a fourth assisted cell; a tenth sending module, configured to send a dedicated radio bearer configuration message to the terminal; and a tenth configuration module, configured to configure at least one eighth dedicated radio bearer for the terminal according to the dedicated radio bearer configuration message, where the dedicated radio bearer configuration message includes a number indication of an assisted cell associated with the eighth dedicated radio bearer and a downlink-only WIFI indication, so that the terminal only receives downlink data of the eighth dedicated radio bearer in the fourth assisted cell according to the downlink-only WIFI indication and the number indication of the assisted cell; and the downlink-only WIFI indication indicates that the eighth dedicated radio bearer is downlink-only, so that the terminal receives, in the fourth assisted cell, the downlink data of the eighth dedicated radio bearer and prohibits sending uplink data.

With reference to the third aspect of the embodiments, or the first implementation manner of the third aspect, or the second implementation manner of the third aspect, or the third implementation manner of the third aspect, or the fourth implementation manner of the third aspect, or the fifth implementation manner of the third aspect, or the sixth implementation manner of the third aspect, or the seventh implementation manner of the third aspect, or the eighth implementation manner of the third aspect, or the ninth implementation manner of the third aspect, or the tenth implementation manner of the third aspect, or the eleventh implementation manner of the third aspect, in a twelfth implementation manner of the third aspect of the embodiments, the access network device further includes: a determining unit, configured to determine, according to a terminal service status, a network load status, or a network channel quality status, whether to configure the local area network for the terminal, and if it is determined to configure the local area network for the terminal, trigger the first execution unit to execute a sending operation; and a receiving unit, configured to receive an acknowledge frame sent by the terminal, to give a feedback that the terminal successfully receives the downlink data.

A fourth aspect of the embodiments provides a terminal, including a receiving unit, configured to receive a local area network configuration message sent by an access network device, to learn a local area network configured by the access network device, and receive a bearer configuration message to learn a dedicated bearer configured by the access network device, where the local area network is associated with the dedicated bearer; and a processing unit, configured to receive, in the local area network associated with the dedicated bearer, according to a downlink-only data reception indication included in the local area network configuration message or in the bearer configuration message, downlink data of the dedicated bearer and prohibit sending uplink data of the dedicated bearer.

With reference to the fourth aspect of the embodiments, in a first implementation manner of the fourth aspect of the embodiments, including the access network device is a radio access network device, the local area network is a wireless local area network WLAN network, and the dedicated bearer is a dedicated radio bearer.

With reference to the fourth aspect of the embodiments, or the first implementation manner of the fourth aspect, in a second implementation manner of the fourth aspect of the embodiments, the terminal device further includes a sending unit, configured to send, to the access network device, an acknowledge frame indicating a downlink data reception success.

A fifth aspect of the embodiments provides an access network device, including a first processor and a first memory that is configured to store and buffer code, where the first processor executes the following process. The process includes sending a local area network configuration message and a bearer configuration message to a terminal, configuring a local area network for the terminal according to the local area network configuration message, and configuring a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

A sixth aspect of the embodiments provides a terminal, including a second processor and a second memory that is configured to store and buffer code, where the second processor executes the following process. The process includes receiving a local area network configuration message sent by an access network device and learning a local area network configured by the access network device, and receiving a bearer configuration message sent by the access network device and learning a dedicated bearer configured by the access network device, where the local area network is associated with the dedicated bearer; and receiving, in the local area network associated with the dedicated bearer, according to a downlink-only data reception indication included in the local area network configuration message or in the bearer configuration message, downlink data of the dedicated bearer and prohibiting sending uplink data of the dedicated bearer.

It can be seen from the foregoing technical solutions that the embodiments have the following advantages.

In the embodiments, an access network device sends a local area network configuration message and a bearer configuration message to a terminal, configures a local area network for the terminal according to the local area network configuration message, and configures a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data, thereby reducing a contention conflict probability and improving network transmission efficiency.

DETAILED DESCRIPTION OF ILLUSTRATIVE EMBODIMENTS

Embodiments provide a service data offloading method, an access network device, and a terminal, which can reduce a contention conflict probability and improve network transmission efficiency.

Figure 1:
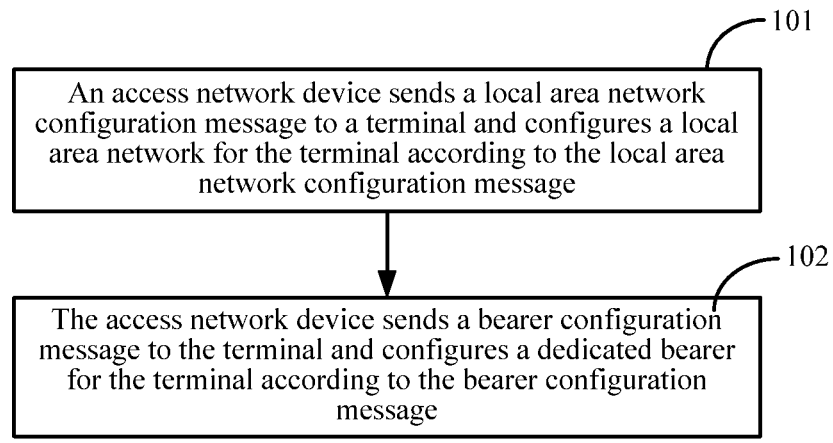
FIG. 1 is a schematic diagram of an embodiment of a service data offloading method in an embodiment.

Referring to FIG. 1, an embodiment of a service data offloading method in this embodiment includes the following steps.

101. An access network device sends a local area network configuration message to a terminal and configures a local area network for the terminal according to the local area network configuration message.

102. The access network device sends a bearer configuration message to the terminal and configures a dedicated bearer for the terminal according to the bearer configuration message, where the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

In this embodiment, an access network device sends a local area network configuration message and a bearer configuration message, and configures a local area network and a dedicated bearer for a terminal according to the local area network configuration message and the bearer configuration message, where the configured local area network is associated with the configured dedicated bearer. Because data is transmitted on the dedicated bearer, during data receiving or data sending in the local area network, the terminal needs to use the dedicated bearer associated with the local area network to implement transmission. Before configuration of the local area network, the access network device may further determine, according to a terminal service, network load, or network channel quality, whether to configure the local area network for the terminal; and if it is determined that the local area network needs to be configured, the local area network configuration message is sent.

The local area network configuration message or the bearer configuration message that is sent by the access network device includes a downlink-only data reception indication, so that the terminal receives, in the local area network according to the downlink-only data reception indication, downlink data of the dedicated bearer and prohibits sending uplink data of the dedicated bearer; and in this case, the access network device may further receive an acknowledge frame sent by the terminal, to give a feedback that the terminal successfully receives the downlink data.

In this embodiment, an access network device sends a local area network configuration message and a bearer configuration message to a terminal, configures a local area network for the terminal according to the local area network configuration message, and configures a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data; in this way, the terminal is prevented from receiving downlink data and sending uplink data simultaneously in the local area network, thereby reducing a contention conflict probability and improving network transmission efficiency.

In this embodiment, for a specific operation of enabling, by the access network device, the terminal to receive, in the local area network according to the downlink-only data reception indication, downlink data of the dedicated bearer and prohibit sending uplink data of the dedicated bearer, and other similar steps or definitions, reference may be made to description in the embodiments shown in FIG. 2 to FIG. 19, and the details are not described herein again.

Figure 2:
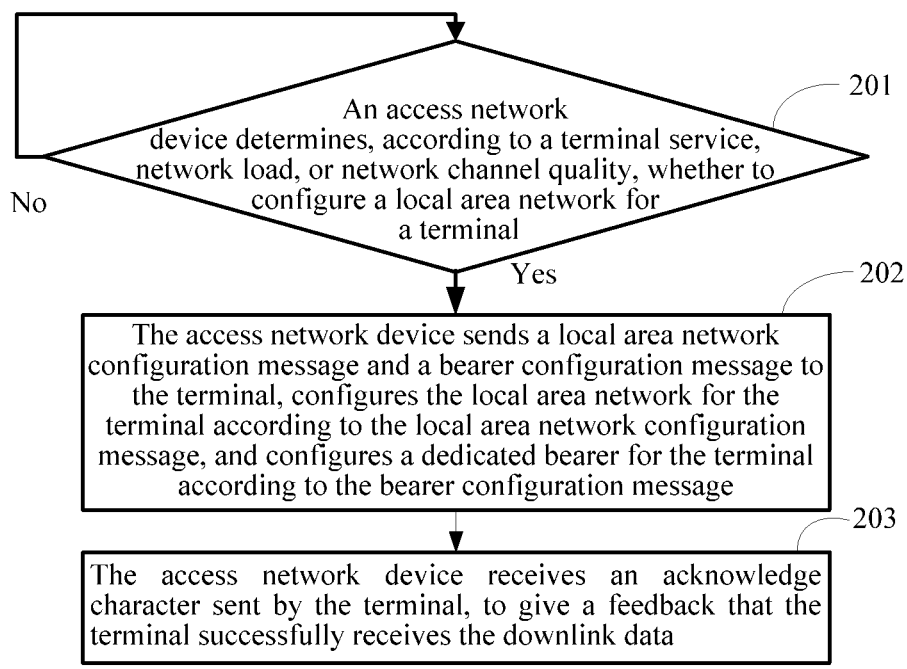
FIG. 2 is a schematic diagram of another embodiment of a service data offloading method in an embodiment.

For ease of understanding, the following describes a service data offloading method in an embodiment by using a specific example. Referring to FIG. 2, another embodiment of the service data offloading method in this embodiment includes the following steps.

201. An access network device determines, according to a terminal service, network load, or network channel quality, whether to configure a local area network for a terminal.

In this embodiment, the access network device may determine, according to a case in which a data amount of the terminal service increases, a network is overloaded, or the network channel quality is poor, whether it is required to configure the local area network; and if it is required to configure the local area network, perform step 202.

202. The access network device sends a local area network configuration message and a bearer configuration message to the terminal, configures the local area network for the terminal according to the local area network configuration message, and configures a dedicated bearer for the terminal according to the bearer configuration message, where the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

In this embodiment, the access network device sends the local area network configuration message and the bearer configuration message, and configures the local area network and the dedicated bearer for the terminal according to the local area network configuration message and the bearer configuration message, where the configured local area network is associated with the configured dedicated bearer. Because data is transmitted on the dedicated bearer, during data receiving or data sending in the local area network, the terminal needs to use the dedicated bearer associated with the local area network to implement transmission.

The local area network configuration message or the bearer configuration message that is sent by the access network device includes a downlink-only data reception indication, so that the terminal can receive, in the local area network according to the downlink-only data reception indication, downlink data of the dedicated bearer and prohibit sending uplink data of the dedicated bearer.

203. The access network device receives an acknowledge frame sent by the terminal, to give a feedback that the terminal successfully receives the downlink data.

In this embodiment, the access network device receives an acknowledge frame (ACK, Acknowledge Character) sent by the terminal, and the access network device learns, according to the ACK, that the terminal successfully receives the downlink data.

In this embodiment, first, an access network device determines, according to a terminal service, network load, or network channel quality, whether to configure a local area network for a terminal; and in this way, the access network device can determine, according to a situation about a result of the determining, whether it is required to configure the local area network, so that the access network device is prevented from blindly configuring the local area network. Then, the access network device sends a local area network configuration message and a bearer configuration message to the terminal, configures the local area network for the terminal according to the local area network configuration message, and configures a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data; in this way, the terminal is prevented from receiving downlink data and sending uplink data simultaneously in the local area network, thereby reducing a contention conflict probability and improving network transmission efficiency.

Figure 3:
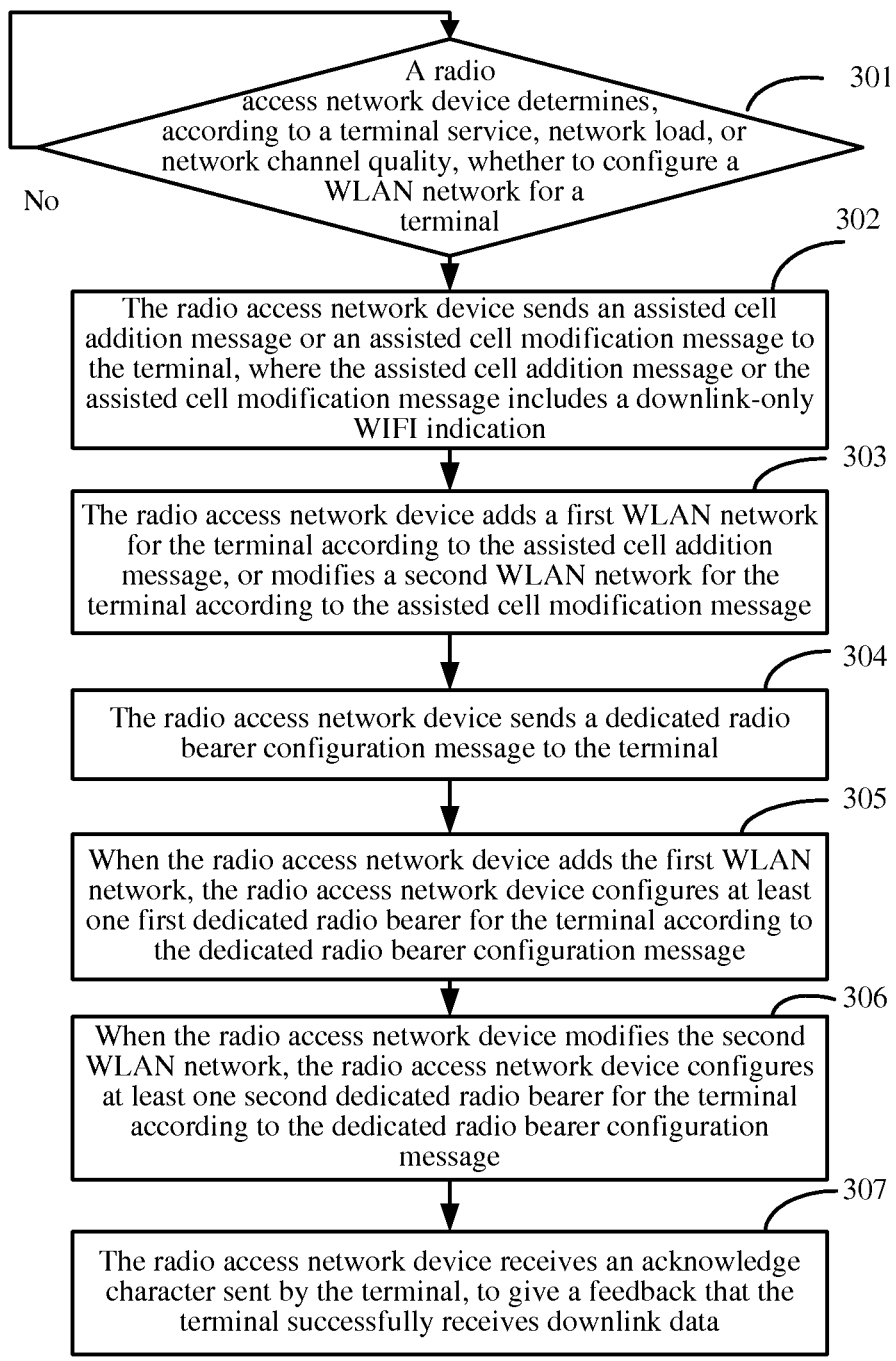
FIG. 3 is a schematic diagram of another embodiment of a service data offloading method in an embodiment.
Figure 4:
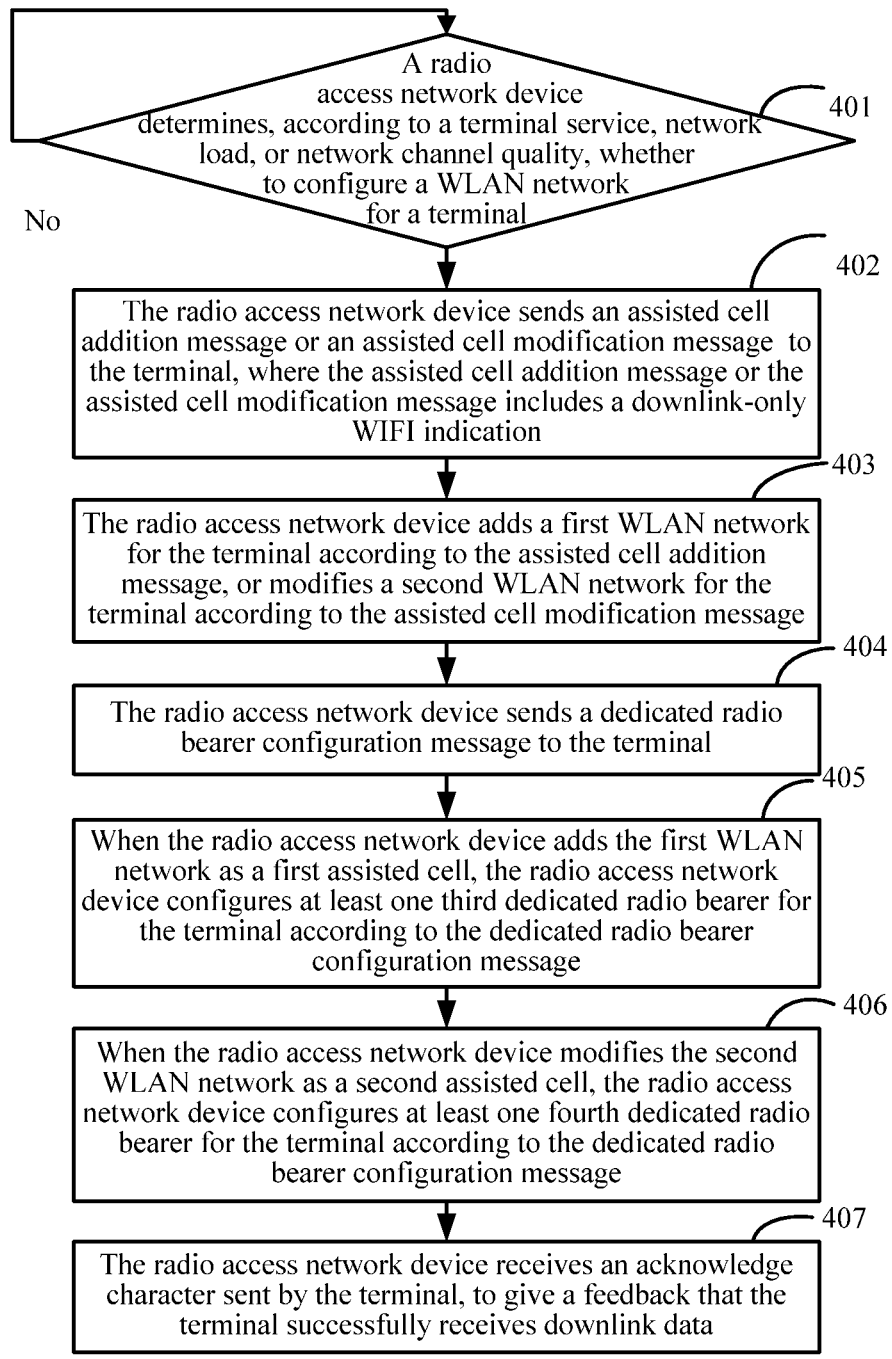
FIG. 4 is a schematic diagram of another embodiment of a service data offloading method in an embodiment.

For ease of understanding, the following embodiment describes a service data offloading method in a wireless environment in this embodiment when a local area network configuration message includes a downlink-only data reception indication. Referring to FIG. 3, another embodiment of the service data offloading method in this embodiment includes the following steps.

301. A radio access network device determines, according to a terminal service, network load, or network channel quality, whether to configure a WLAN network for a terminal.

In this embodiment, the radio access network device may determine, according to a case in which a data amount of the terminal service increases, a network is overloaded, or the network channel quality is poor, whether it is required to configure the WLAN network; and if it is required to configure the WLAN network, perform step 302.

302. The radio access network device sends an assisted cell addition message or an assisted cell modification message to the terminal, where the assisted cell addition message or the assisted cell modification message includes a downlink-only WIFI indication.

303. The radio access network device adds a first WLAN network for the terminal according to the assisted cell addition message, or modifies a second WLAN network for the terminal according to the assisted cell modification message.

In this embodiment, the radio access network device sends, to the terminal, an assisted cell addition message (Scell Addition) that carries a downlink-only wireless fidelity (WIFI) indication, and adds the first WLAN network for the terminal according to Scell Addition; or sends an assisted cell modification message (Scell Modification) that carries a downlink-only WIFI indication and modifies the second WLAN network for the terminal according to Scell Modification, where the downlink-only WIFI indication indicates that the first WLAN network or the second WLAN network is downlink-only, so that the terminal receives, in the first WLAN network or the second WLAN network, downlink data and prohibits sending uplink data.

It should be noted that, if the terminal is far away from a base station of a 3rd Generation Partnership Project (3GPP) radio access network, in consideration of reduction of terminal power consumption, an uplink-only WLAN network may also be configured for the terminal.

304. The radio access network device sends a dedicated radio bearer configuration message to the terminal.

In this embodiment, after configuring the WLAN network for the terminal, the radio access network device sends the dedicated radio bearer (DRB) configuration message to the terminal.

305. When the radio access network device adds the first WLAN network, the radio access network device configures at least one first dedicated radio bearer for the terminal according to the dedicated radio bearer configuration message.

In this embodiment, when the first WLAN network is added in step 303, the radio access network device configures at least one first dedicated radio bearer for the terminal according to the DRB configuration message, where the first dedicated radio bearer is associated with the first WLAN network. Because data is transmitted on the radio bearer, it is required to configure, for the first WLAN network, one or more first dedicated radio bearers that are associated with the first WLAN network.

The DRB configuration message includes an identifier of the first WLAN network associated with the first dedicated radio bearer, where an identifier of a WLAN network may be a service set identifier (SSID) of an AP, or may be a basic service set identifier (BSSID) or a Media Access Control (MAC) address. In this way, the terminal can receive, in the downlink-only first WLAN network according to the assisted cell addition message including the downlink-only WIFI indication in step 302 and the identifier of the first WLAN network associated with the first dedicated radio bearer, downlink data of the first dedicated radio bearer and prohibit sending uplink data of the first dedicated radio bearer.

The uplink data of the corresponding first dedicated radio bearer, a hybrid automatic repeat request (HARQ) feedback of the uplink data, a downlink radio link control (RLC) status report, and the like are all transmitted in a 3GPP radio access network.

306. When the radio access network device modifies the second WLAN network, the radio access network device configures at least one second dedicated radio bearer for the terminal according to the dedicated radio bearer configuration message.

In this embodiment, when the second WLAN network is modified in step 303, the radio access network device configures at least one second dedicated radio bearer for the terminal according to the DRB configuration message, where the second dedicated radio bearer is associated with the second WLAN network. Because data is transmitted on the radio bearer, it is required to configure, for the second WLAN network, one or more second dedicated radio bearers that are associated with the second WLAN network.

The DRB configuration message includes an identifier of the second WLAN network associated with the second dedicated radio bearer, where an identifier of a WLAN network may be an SSID of an AP, or may be a BSSID, or may be a Media Access Control MAC address. In this way, the terminal can receive, in the second WLAN network according to the assisted cell modification message including the downlink-only WIFI indication in step 302 and the identifier of the second WLAN network associated with the second dedicated radio bearer, downlink data of the second dedicated radio bearer and prohibit sending uplink data of the second dedicated radio bearer.

The uplink data of the corresponding second dedicated radio bearer, an HARQ feedback of the uplink data, a downlink RLC status report, and the like are all transmitted in a 3GPP radio access network.

307. The radio access network device receives an acknowledge frame sent by the terminal, to give a feedback that the terminal successfully receives downlink data.

In this embodiment, the radio access network device receives an ACK sent by the terminal, so that the radio access network device learns, according to the ACK, that the terminal successfully receives the downlink data.

In this embodiment, a radio access network device sends, to a terminal, an assisted cell addition message including a downlink-only WIFI indication, and then adds a first WLAN network for the terminal according to the assisted cell addition message; the radio access network device sends a DRB configuration message to the terminal, and when the radio access network device adds the first WLAN network, the radio access network device configures at least one first dedicated radio bearer for the terminal according to the DRB configuration message, so that the terminal receives, in a downlink-only first WLAN network according to an identifier that is included in the DRB configuration message and of the first WLAN network associated with the first dedicated radio bearer and according to the downlink-only WIFI indication included in the assisted cell addition message, downlink data of the first dedicated radio bearer and prohibits sending uplink data of the first dedicated radio bearer; in this way, the terminal is prevented from receiving downlink data and sending uplink data simultaneously in the local area network, thereby reducing a contention conflict probability and improving network transmission efficiency.

In this embodiment, a radio access network device sends, to a terminal, an assisted cell modification message including a downlink-only WIFI indication, and then adds a second WLAN network for the terminal according to the assisted cell modification message; the radio access network device sends a DRB configuration message to the terminal, and when the radio access network device modifies the second WLAN network, the radio access network device configures at least one second dedicated radio bearer for the terminal according to the DRB configuration message, so that the terminal receives, in a downlink-only second WLAN network according to an identifier that is included in the DRB configuration message and of the second WLAN network associated with the second dedicated radio bearer and according to the downlink-only WIFI indication included in the assisted cell modification message, downlink data of the second dedicated radio bearer and prohibits sending uplink data of the second dedicated radio bearer; in this way, the terminal is prevented from receiving downlink data and sending uplink data simultaneously in the local area network, thereby reducing a contention conflict probability and improving network transmission efficiency.

The following embodiment describes a service data offloading method in a wireless environment in this embodiment when a local area network configuration message includes a downlink-only data reception indication and a WLAN network is used as an assisted cell. Referring to FIG.

4, another embodiment of the service data offloading method in this embodiment includes the following steps.

401. A radio access network device determines, according to a terminal service, network load, or network channel quality, whether to configure a WLAN network for a terminal.

In this embodiment, the radio access network device may determine, according to a case in which a data amount of the terminal service increases, a network is overloaded, or the network channel quality is poor, whether it is required to configure the WLAN network; and if it is required to configure the WLAN network, perform step 402.

402. The radio access network device sends an assisted cell addition message or an assisted cell modification message to the terminal, where the assisted cell addition message or the assisted cell modification message includes a downlink-only WIFI indication.

403. The radio access network device adds a first WLAN network for the terminal according to the assisted cell addition message, or modifies a second WLAN network for the terminal according to the assisted cell modification message.

In this embodiment, the radio terminal sends, to the terminal, an assisted cell addition message that carries a downlink-only WIFI indication, and adds the first WLAN network for the terminal according to the assisted cell addition message; or sends an assisted cell modification message that carries a downlink-only WIFI indication and modifies the second WLAN network for the terminal according to the assisted cell modification message, where the downlink-only WIFI indication indicates that the first WLAN network or the second WLAN network is downlink-only, so that the terminal receives, in the first WLAN network or the second WLAN network, downlink data and prohibits sending uplink data.

It should be noted that, if the terminal is far away from a base station of a 3GPP radio access network, in consideration of reduction of terminal power consumption, an uplink-only WLAN network may also be configured for the terminal.

404. The radio access network device sends a dedicated radio bearer configuration message to the terminal.

In this embodiment, after configuring the WLAN network for the terminal, the radio access network device sends the DRB configuration message to the terminal.

405. When the radio access network device adds the first WLAN network as a first assisted cell, the radio access network device configures at least one third dedicated radio bearer for the terminal according to the dedicated radio bearer configuration message.

In this embodiment, when the first WLAN network is added as the first assisted cell in step 403, the radio access network device configures at least one third dedicated radio bearer for the terminal according to the DRB configuration message, where the third dedicated radio bearer is associated with the first assisted cell. Because data is transmitted on the radio bearer, it is required to configure, for the first assisted cell, one or more third dedicated radio bearers that are associated with the first assisted cell.

The DRB configuration message includes a number indication of an assisted cell associated with the third dedicated radio bearer, where the number indication of the assisted cell indicates that the assisted cell associated with the third dedicated radio bearer is the first assisted cell. In this way, the terminal can receive, in the downlink-only first assisted cell according to the assisted cell addition message including the downlink-only WIFI indication in step 402 and the number indication of the assisted cell associated with the third dedicated radio bearer, downlink data of the third dedicated radio bearer and prohibit sending uplink data of the third dedicated radio bearer.

The uplink data of the corresponding third dedicated radio bearer, an HARQ feedback of the uplink data, a downlink RLC status report, and the like are all transmitted in a 3GPP radio access network.

406. When the radio access network device modifies the second WLAN network as a second assisted cell, the radio access network device configures at least one fourth dedicated radio bearer for the terminal according to the dedicated radio bearer configuration message.

In this embodiment, when the second assisted cell is modified in step 403, the radio access network device configures at least one fourth dedicated radio bearer for the terminal according to the DRB configuration message, where the fourth dedicated radio bearer is associated with the second assisted cell. Because data is transmitted on the radio bearer, it is required to configure, for the second assisted cell, one or more fourth dedicated radio bearers that are associated with the second assisted cell.

The DRB configuration message includes a number indication of an assisted cell associated with the fourth dedicated radio bearer, where the number indication of the assisted cell indicates that the assisted cell associated with the fourth dedicated radio bearer is the second assisted cell. In this way, the terminal can receive, in the second assisted cell according to the assisted cell modification message including the downlink-only WIFI indication in step 402 and the number indication of the assisted cell associated with the fourth dedicated radio bearer, downlink data of the fourth dedicated radio bearer and prohibit sending uplink data of the fourth dedicated radio bearer.

The uplink data of the corresponding fourth dedicated radio bearer, an HARQ feedback of the uplink data, a downlink RLC status report, and the like are all transmitted in a 3GPP radio access network.

407. The radio access network device receives an acknowledge frame sent by the terminal, to give a feedback that the terminal successfully receives downlink data.

In this embodiment, the radio access network device receives an ACK sent by the terminal, so that the radio access network device learns, according to the ACK, that the terminal successfully receives the downlink data.

In this embodiment, a radio access network device sends, to a terminal, an assisted cell addition message including a downlink-only WIFI indication, and then adds a first WLAN network for the terminal according to the assisted cell addition message; the radio access network device sends a DRB configuration message to the terminal, and when the radio access network device adds the first WLAN network as a first assisted cell, the radio access network device configures at least one third dedicated radio bearer for the terminal according to the DRB configuration message, so that the terminal receives, in a downlink-only first assisted cell according to a number indication that is included in the DRB configuration message and of the assisted cell associated with the third dedicated radio bearer and according to the downlink-only WIFI indication included in the assisted cell addition message, downlink data of the third dedicated radio bearer and prohibits sending uplink data of the third dedicated radio bearer; in this way, the terminal is prevented from receiving downlink data and sending uplink data simultaneously in a WLAN network, thereby reducing a contention conflict probability and improving network transmission efficiency.

In this embodiment, a radio access network device sends, to a terminal, an assisted cell modification message including a downlink-only WIFI indication, and then adds a second WLAN network for the terminal according to the assisted cell modification message; the radio access network device sends a DRB configuration message to the terminal, and when the radio access network device adds the second WLAN network as a second assisted cell, the radio access network device configures at least one fourth dedicated radio bearer for the terminal according to the dedicated radio bearer configuration message, so that the terminal receives, in the downlink-only second assisted cell according to a number indication that is included in the DRB configuration message and of the assisted cell associated with the fourth dedicated radio bearer and according to the downlink-only WIFI indication included in the assisted cell modification message, downlink data of the fourth dedicated radio bearer and prohibits sending uplink data of the fourth dedicated radio bearer; in this way, the terminal is prevented from receiving downlink data and sending uplink data simultaneously in a WLAN network, thereby reducing a contention conflict probability and improving network transmission efficiency.

Figure 5:
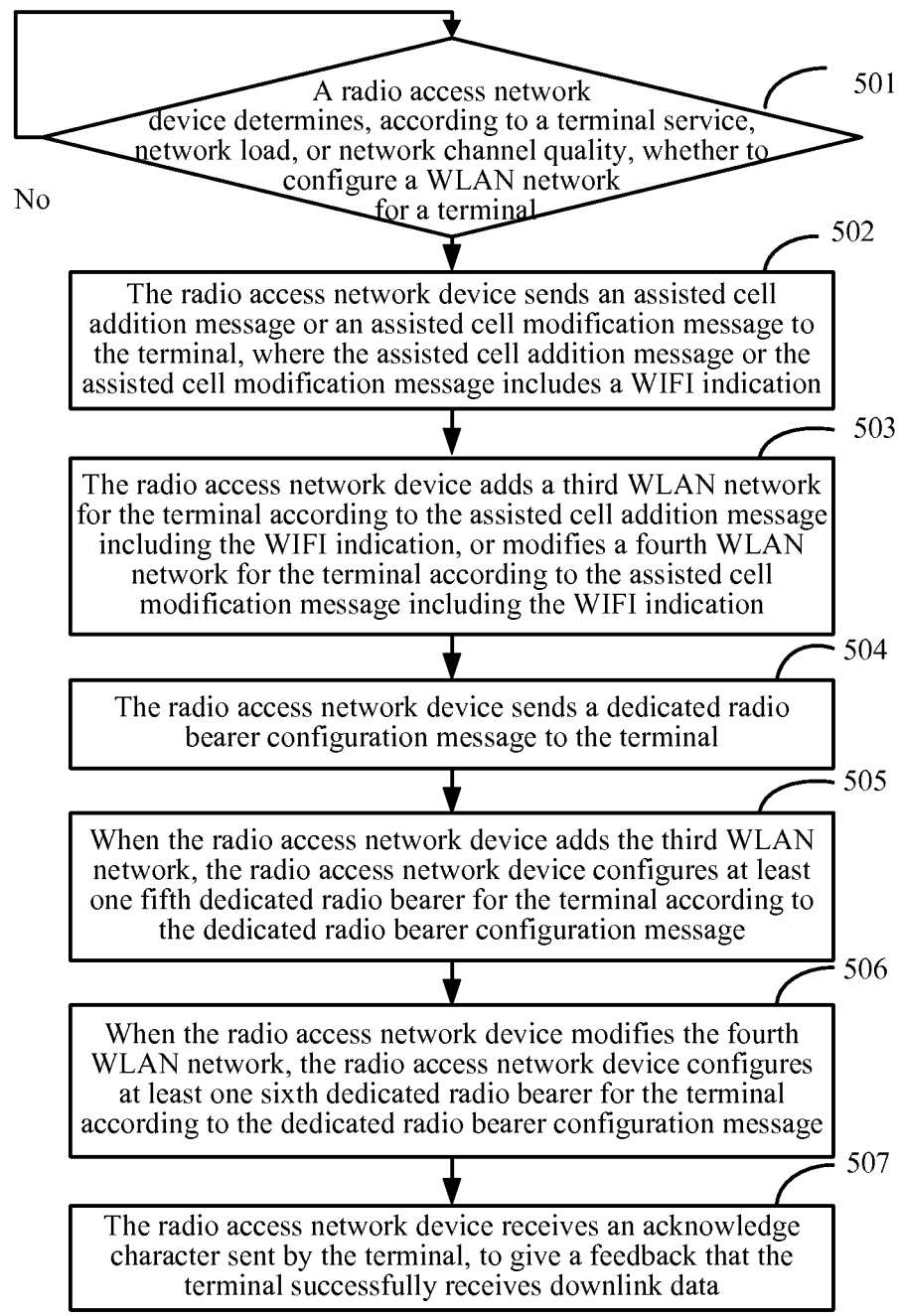
FIG. 5 is a schematic diagram of another embodiment of a service data offloading method in an embodiment.

The following embodiment describes a service data offloading method in a wireless environment in this embodiment when a bearer configuration message includes a downlink-only data reception indication. Referring to FIG. 5, another embodiment of the service data offloading method in this embodiment includes the following steps.

501. A radio access network device determines, according to a terminal service, network load, or network channel quality, whether to configure a WLAN network for a terminal.

In this embodiment, the radio access network device may determine, according to a case in which a data amount of the terminal service increases, a network is overloaded, or the network channel quality is poor, whether it is required to configure the WLAN network; and if it is required to configure the WLAN network, perform step 502.

502. The radio access network device sends an assisted cell addition message or an assisted cell modification message to the terminal, where the assisted cell addition message or the assisted cell modification message includes a WIFI indication.

503. The radio access network device adds a third WLAN network for the terminal according to the assisted cell addition message including the WIFI indication, or modifies a fourth WLAN network for the terminal according to the assisted cell modification message including the WIFI indication.

In this embodiment, the radio access network device sends, to the terminal, the assisted cell addition message that carries a WIFI indication and adds the third WLAN network for the terminal according to the assisted cell addition message; or sends an assisted cell modification message that carries a WIFI indication and modifies the fourth WLAN network for the terminal according to the assisted cell modification message, where the WIFI indication indicates that an added assisted cell or a modified assisted cell is a WLAN network.

504. The radio access network device sends a dedicated radio bearer configuration message to the terminal.

In this embodiment, after configuring the WLAN network for the terminal, the radio access network device sends the DRB configuration message to the terminal.

505. When the radio access network device adds the third WLAN network, the radio access network device configures at least one fifth dedicated radio bearer for the terminal according to the dedicated radio bearer configuration message.

When the third WLAN network is added in step 503, the radio access network device configures at least one fifth dedicated radio bearer for the terminal according to the DRB configuration message, where the fifth dedicated radio bearer is associated with the third WLAN network. Because data is transmitted on the radio bearer, it is required to configure, for the third WLAN network, one or more fifth dedicated radio bearers that are associated with the third WLAN network.

The DRB configuration message includes a downlink-only WIFI indication, so as to indicate that the fifth dedicated radio bearer is downlink-only, so that the terminal receives downlink data of the fifth dedicated radio bearer and prohibits sending uplink data of the fifth dedicated radio bearer.

The DRB configuration message includes an identifier of the third WLAN network associated with the fifth dedicated radio bearer, where an identifier of a WLAN network may be an SSID of an AP, or may be a BSSID, or may be a MAC address, so that the terminal receives, in the third WLAN network according to the downlink-only WIFI indication and the identifier of the third WLAN network, downlink data of the fifth dedicated radio bearer and prohibits sending uplink data of the fifth dedicated radio bearer.

The uplink data of the corresponding fifth dedicated radio bearer, an HARQ feedback of the uplink data, a downlink RLC status report, and the like are all transmitted in a 3GPP radio access network.

506. When the radio access network device modifies the fourth WLAN network, the radio access network device configures at least one sixth dedicated radio bearer for the terminal according to the dedicated radio bearer configuration message.

In this embodiment, when the fourth WLAN network is modified in step 503, the radio access network device configures at least one sixth dedicated radio bearer for the terminal according to the DRB configuration message, where the sixth dedicated radio bearer is associated with the fourth WLAN network. Because data is transmitted on the radio bearer, it is required to configure, for the fourth WLAN network, one or more sixth dedicated radio bearers that are associated with the fourth WLAN network.

The DRB configuration message includes a downlink-only WIFI indication, so as to indicate that the sixth dedicated radio bearer is downlink-only, so that the terminal receives the downlink data of the sixth dedicated radio bearer and prohibits sending uplink data of the sixth dedicated radio bearer.

The DRB configuration message includes an identifier of the fourth WLAN network associated with the sixth dedicated radio bearer, where an identifier of a WLAN network may be an SSID of an AP, or may be a BSSID, or may be a MAC address, so that the terminal receives, in the fourth WLAN network according to the downlink-only WIFI indication and the identifier of the fourth WLAN network, downlink data of the sixth dedicated radio bearer and prohibits sending uplink data of the sixth dedicated radio bearer.

The uplink data of the corresponding sixth dedicated radio bearer, an HARQ feedback of the uplink data, a downlink RLC status report, and the like are all transmitted in a 3GPP radio access network.

507. The radio access network device receives an acknowledge frame sent by the terminal, to give a feedback that the terminal successfully receives downlink data.

In this embodiment, the radio access network device receives an ACK sent by the terminal, so that the radio access network device learns, according to the ACK, that the terminal successfully receives the downlink data.

In this embodiment, a radio access network device sends, to a terminal, an assisted cell addition message including a WIFI indication, and then adds a third WLAN network for the terminal according to the assisted cell addition message; the radio access network device sends, to the terminal, a dedicated radio bearer configuration message including a downlink-only WIFI indication, and when the radio access network device adds the third WLAN network, the radio access network device configures at least one fifth dedicated radio bearer for the terminal according to the dedicated radio bearer configuration message, so that the terminal receives, in the downlink-only third WLAN network according to an identifier that is included in the DRB configuration message and of the third WLAN network associated with the fifth dedicated radio bearer and according to the included downlink-only WIFI indication, downlink data of the fifth dedicated radio bearer and prohibits sending uplink data of the fifth dedicated radio bearer; in this way, the terminal is prevented from receiving downlink data and sending uplink data simultaneously in a WLAN network, thereby reducing a contention conflict probability and improving network transmission efficiency.

In this embodiment, a radio access network device sends, to a terminal, an assisted cell modification message including a WIFI indication, and then modifies a fourth WLAN network for the terminal according to the assisted cell modification message; the radio access network device sends, to the terminal, a dedicated radio bearer configuration message including a downlink-only WIFI indication, and when the radio access network device modifies the fourth WLAN network, the radio access network device configures at least one sixth dedicated radio bearer for the terminal according to the dedicated radio bearer configuration message, so that the terminal receives, in the downlink-only fourth WLAN network according to an identifier that is included in the DRB configuration message and of the fourth WLAN network associated with the sixth dedicated radio bearer and according to the included downlink-only WIFI indication, downlink data of the sixth dedicated radio bearer and prohibits sending uplink data of the sixth dedicated radio bearer; in this way, the terminal is prevented from receiving downlink data and sending uplink data simultaneously in a WLAN network, thereby reducing a contention conflict probability and improving network transmission efficiency.

Figure 6:
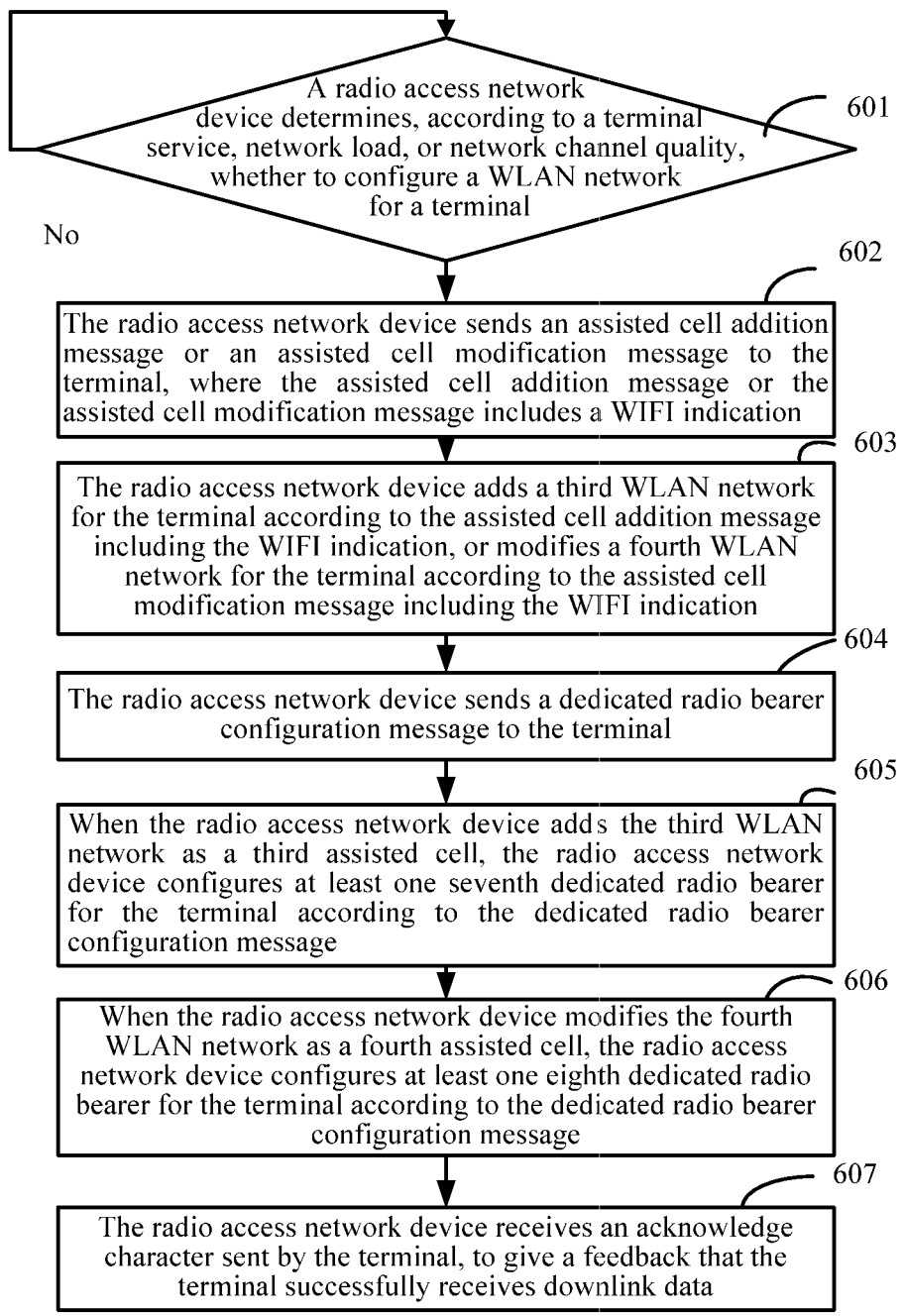
FIG. 6 is a schematic diagram of another embodiment of a service data offloading method in an embodiment.

The following embodiment describes a service data offloading method in a wireless environment in this embodiment when a bearer configuration message includes a downlink-only data reception indication and a WLAN network is used as an assisted cell. Referring to FIG. 6, another embodiment of the service data offloading method in this embodiment includes the following steps.

601. A radio access network device determines, according to a terminal service, network load, or network channel quality, whether to configure a WLAN network for a terminal.

In this embodiment, the radio access network device may determine, according to a case in which a data amount of the terminal service increases, a network is overloaded, or the network channel quality is poor, whether it is required to configure the WLAN network; and if it is required to configure the WLAN network, perform step 602.

602. The radio access network device sends an assisted cell addition message or an assisted cell modification message to the terminal, where the assisted cell addition message or the assisted cell modification message includes a WIFI indication.

603. The radio access network device adds a third WLAN network for the terminal according to the assisted cell addition message including the WIFI indication, or modifies a fourth WLAN network for the terminal according to the assisted cell modification message including the WIFI indication.

In this embodiment, the radio access network device sends, to the terminal, the assisted cell addition message that carries a WIFI indication and adds the third WLAN network for the terminal according to the assisted cell addition message; or sends an assisted cell modification message that carries a WIFI indication and modifies the fourth WLAN network for the terminal according to the assisted cell modification message, where the WIFI indication indicates that an added assisted cell or a modified assisted cell is a WLAN network.

604. The radio access network device sends a dedicated radio bearer configuration message to the terminal.

In this embodiment, after configuring the WLAN network for the terminal, the radio access network device sends the DRB configuration message to the terminal.

605. When the radio access network device adds the third WLAN network as a third assisted cell, the radio access network device configures at least one seventh dedicated radio bearer for the terminal according to the dedicated radio bearer configuration message.

When the third WLAN network is added as the third assisted cell in step 603, the radio access network device configures at least one seventh dedicated radio bearer for the terminal according to the DRB configuration message, where the seventh dedicated radio bearer is associated with the third assisted cell. Because data is transmitted on the radio bearer, it is required to configure, for the third assisted cell, one or more seventh dedicated radio bearers that are associated with the third assisted cell.

The DRB configuration message includes a downlink-only WIFI indication, so as to indicate that the seventh dedicated radio bearer is downlink-only, so that the terminal receives downlink data of the seventh dedicated radio bearer and prohibits sending uplink data of the seventh dedicated radio bearer.

The DRB configuration message includes a number indication of an assisted cell associated with the seventh dedicated radio bearer, where the number indication of the assisted cell indicates that the assisted cell associated with the seventh dedicated radio bearer is the third assisted cell, so that the terminal receives, in the third assisted cell according to the downlink-only WIFI indication and the number indication of the assisted cell, the downlink data of the seventh dedicated radio bearer and prohibits sending the uplink data of the seventh dedicated radio bearer.

The uplink data of the corresponding seventh dedicated radio bearer, an HARQ feedback of the uplink data, a downlink RLC status report, and the like are all transmitted in a 3GPP radio access network.

606. When the radio access network device modifies the fourth WLAN network as a fourth assisted cell, the radio access network device configures at least one eighth dedicated radio bearer for the terminal according to the dedicated radio bearer configuration message.

In this embodiment, when the fourth WLAN network is modified as the fourth assisted cell in step 603, the radio access network device configures at least one eighth dedicated radio bearer for the terminal according to the DRB configuration message, where the eighth dedicated radio bearer is associated with the fourth assisted cell. Because data is transmitted on the radio bearer, it is required to configure, for the fourth assisted cell, one or more eighth dedicated radio bearers that are associated with the fourth assisted cell.

The DRB configuration message includes a downlink-only WIFI indication, so as to indicate that the eighth dedicated radio bearer is downlink-only, so that the terminal receives downlink data of the eighth dedicated radio bearer and prohibits sending uplink data of the eighth dedicated radio bearer.

The DRB configuration message further includes a number indication of an assisted cell associated with the eighth dedicated radio bearer, where the number indication of the assisted cell indicates that the assisted cell associated with the eighth dedicated radio bearer is the fourth assisted cell, so that the terminal receives, in the fourth assisted cell according to the downlink-only WIFI indication and the number indication of the assisted cell, the downlink data of the eighth dedicated radio bearer and prohibits sending the uplink data of the eighth dedicated radio bearer.

The uplink data of the corresponding eighth dedicated radio bearer, an HARQ feedback of the uplink data, a downlink RLC status report, and the like are all transmitted in a 3GPP radio access network.

607. The radio access network device receives an acknowledge frame sent by the terminal, to give a feedback that the terminal successfully receives downlink data.

In this embodiment, the radio access network device receives an ACK sent by the terminal, so that the radio access network device learns, according to the ACK, that the terminal successfully receives the downlink data.

In this embodiment, a radio access network device sends, to a terminal, an assisted cell addition message including a WIFI indication, and then adds a third WLAN network for the terminal according to the assisted cell addition message; the radio access network device sends, to the terminal, a dedicated radio bearer configuration message including a downlink-only WIFI indication, and when the radio access network device adds the third WLAN network as a third assisted cell, the radio access network device configures at least one seventh dedicated radio bearer for the terminal according to the dedicated radio bearer configuration message, so that the terminal receives, in the downlink-only third assisted cell according to a number indication that is included in the DRB configuration message and of the assisted cell associated with the seventh dedicated radio bearer and according to the included downlink-only WIFI indication, downlink data of the seventh dedicated radio bearer and prohibits sending uplink data of the seventh dedicated radio bearer; in this way, the terminal is prevented from receiving downlink data and sending uplink data simultaneously in a WLAN network, thereby reducing a contention conflict probability and improving network transmission efficiency.

In this embodiment, a radio access network device sends, to a terminal, an assisted cell modification message including a WIFI indication, and then modifies a fourth WLAN network for the terminal according to the assisted cell modification message; the radio access network device sends, to the terminal, a dedicated radio bearer configuration message including a downlink-only WIFI indication, and when the radio access network device modifies the fourth WLAN network as a fourth assisted cell, the radio access network device configures at least one eighth dedicated radio bearer for the terminal according to the dedicated radio bearer configuration message, so that the terminal receives, in the downlink-only fourth assisted cell according to a number indication that is included in the DRB configuration message and of the assisted cell associated with the eighth dedicated radio bearer and according to the included downlink-only WIFI indication, downlink data of the eighth dedicated radio bearer and prohibits sending uplink data of the eighth dedicated radio bearer; in this way, the terminal is prevented from receiving downlink data and sending uplink data simultaneously in a WLAN network, thereby reducing a contention conflict probability and improving network transmission efficiency.

Figure 7:
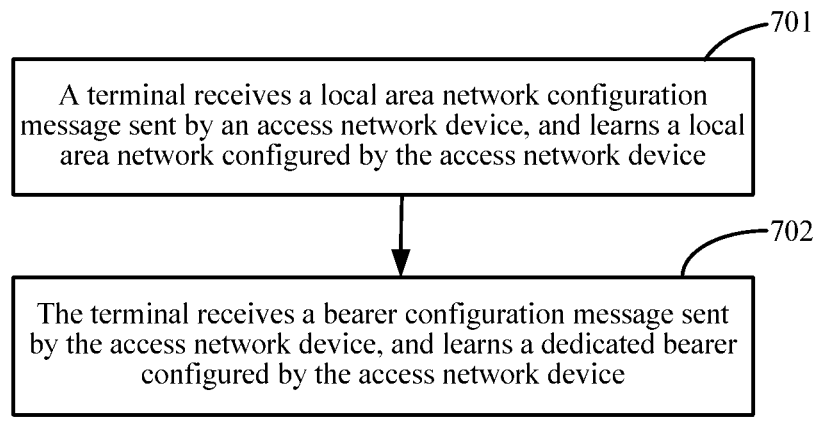
FIG. 7 is a schematic diagram of another embodiment of a service data offloading method in an embodiment.

The foregoing embodiment describes the service data offloading method in an embodiment from the perspective of a radio access network device, and the following describes the service data offloading method in an embodiment from the perspective of a terminal. Referring to FIG. 7, another embodiment of the service data offloading method in this embodiment includes the following steps.

701. A terminal receives a local area network configuration message sent by an access network device, and learns a local area network configured by the access network device.

702. The terminal receives a bearer configuration message sent by the access network device, and learns a dedicated bearer configured by the access network device, where the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

In this embodiment, the configured local area network is associated with the configured dedicated bearer, and the local area network configuration message or the bearer configuration message includes the downlink-only data reception indication.

The terminal receives, in the local area network associated with the dedicated bearer, according to the downlink-only data reception indication included in the local area network configuration message or in the bearer configuration message, downlink data of the dedicated bearer and prohibits sending uplink data of the dedicated bearer.

In this embodiment, a terminal receives a local area network configuration message sent by an access network device, and learns a local area network configured by the access network device; and receives a bearer configuration message sent by the access network device, and learns a dedicated bearer configured by the access network device, where the local area network is associated with the dedicated bearer, and the local area network configuration message or the bearer configuration message includes a downlink-only data reception indication, so that the terminal receives, in the local area network associated with the dedicated bearer, according to the downlink-only data reception indication included in the local area network configuration message or in the bearer configuration message, downlink data of the dedicated bearer and prohibits sending uplink data of the dedicated bearer. In this way, the terminal is prevented from receiving downlink data and sending uplink data simultaneously in the local area network, thereby reducing a contention conflict probability and improving network transmission efficiency.

Figure 8:
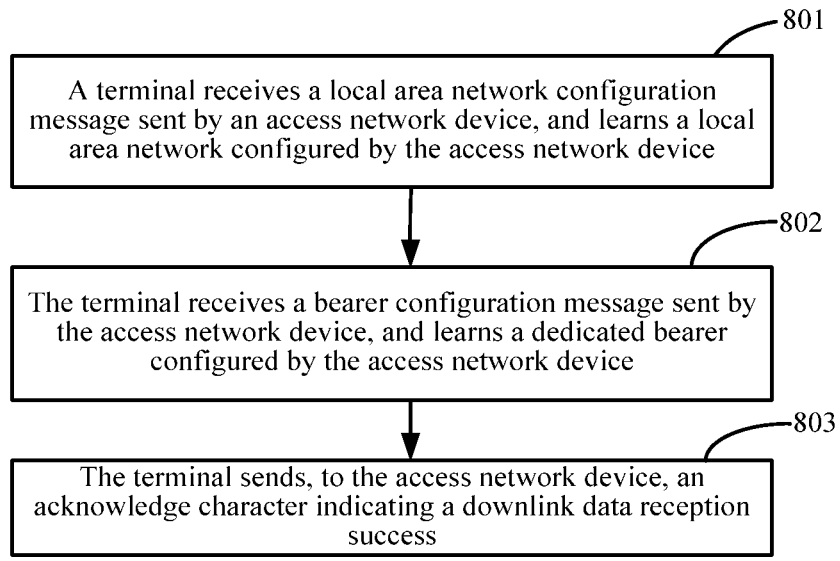
FIG. 8 is a schematic diagram of another embodiment of a service data offloading method in an embodiment.
Figure 9:
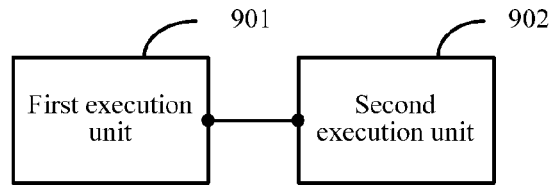
FIG. 9 is a schematic diagram of an embodiment of an access network device in an embodiment.

For ease of understanding, the following describes a service data offloading method in an embodiment by using a specific example and from the perspective of a terminal. Referring to FIG. 8, another embodiment of the service data offloading method in this embodiment includes the following steps.

801. A terminal receives a local area network configuration message sent by an access network device, and learns a local area network configured by the access network device.

802. The terminal receives a bearer configuration message sent by the access network device, and learns a dedicated bearer configured by the access network device, where the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

In this embodiment, the configured local area network is associated with the configured dedicated bearer, and the local area network configuration message or the bearer configuration message includes the downlink-only data reception indication.

The terminal receives, in the local area network associated with the dedicated bearer, according to the downlink-only data reception indication included in the local area network configuration message or in the bearer configuration message, downlink data of the dedicated bearer and prohibits sending uplink data of the dedicated bearer.

803. The terminal sends, to the access network device, an acknowledge frame indicating a downlink data reception success.

In this embodiment, the terminal sends the acknowledge frame to inform the access network device of a downlink data reception success.

It should be noted that the service data offloading method in a wireless environment in this embodiment may be further described in this embodiment.

The following describes an access network device for executing the foregoing service data offloading method in an embodiment. For a basic logical structure thereof, refer to FIG. 9, and an embodiment of the access network device in this embodiment includes a first execution unit 901, configured to send a local area network configuration message to a terminal and configure a local area network for the terminal according to the local area network configuration message; and a second execution unit 902, configured to send a bearer configuration message to the terminal and configure a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

In this embodiment, a first execution unit 901 sends a local area network configuration message to a terminal and configures a local area network for the terminal according to the local area network configuration message; a second execution unit 902 sends a bearer configuration message to the terminal and configures a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data; in this way, the terminal is prevented from receiving downlink data and sending uplink data simultaneously in the local area network, thereby reducing a contention conflict probability and improving network transmission efficiency.

Figure 10:
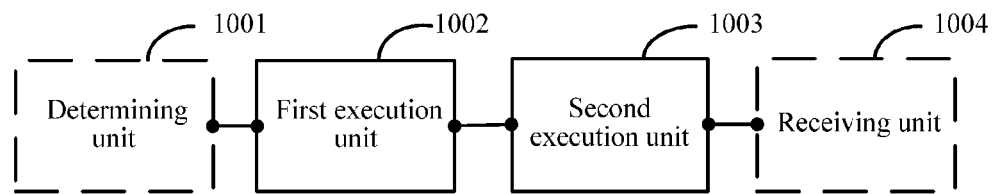
FIG. 10 is a schematic diagram of another embodiment of an access network device in an embodiment.
Figure 11:
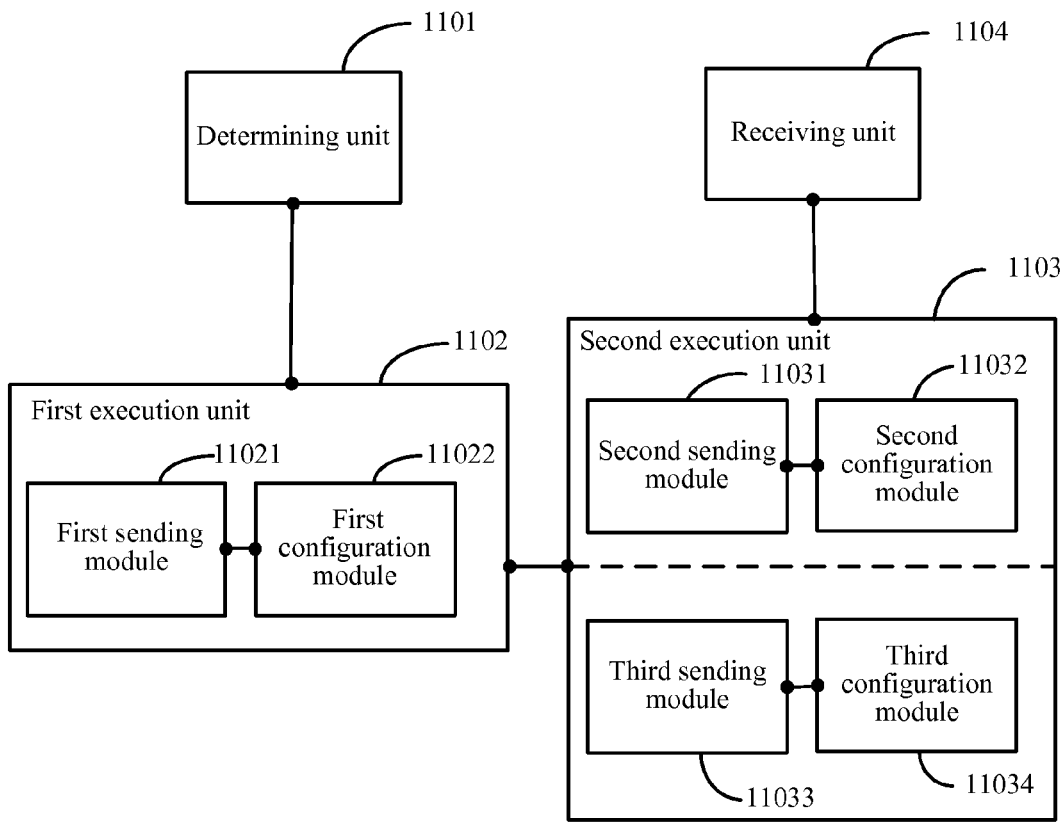
FIG. 11 is a schematic diagram of another embodiment of an access network device in an embodiment.
Figure 12:
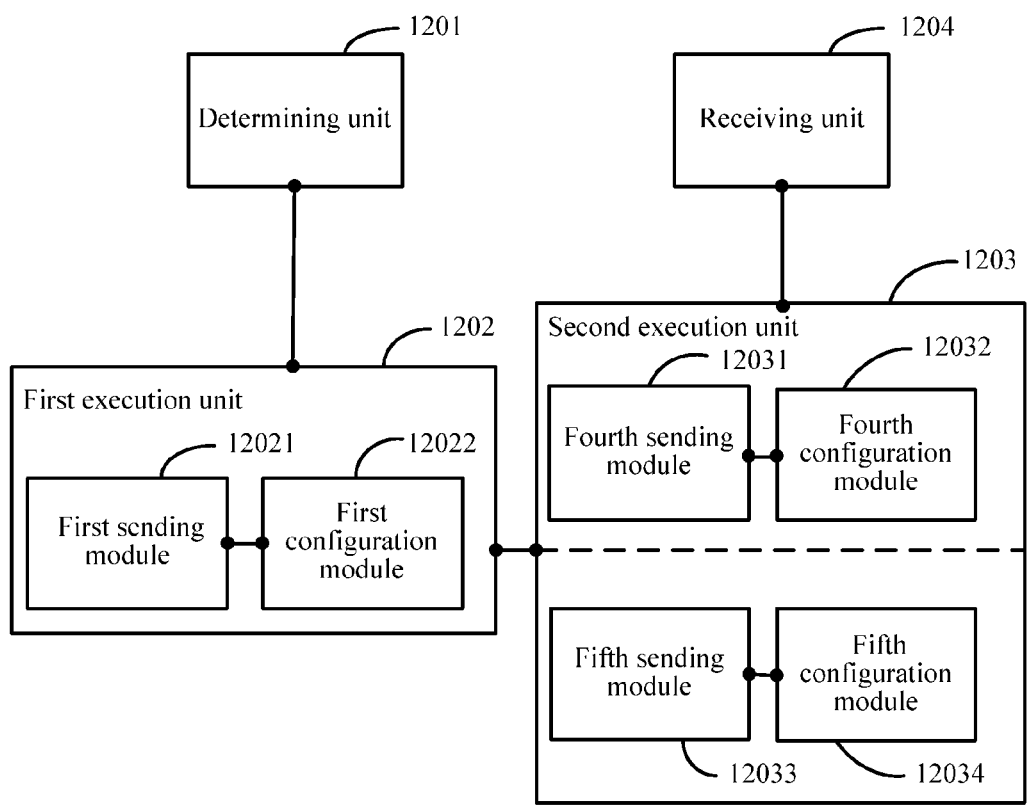
FIG. 12 is a schematic diagram of another embodiment of an access network device in an embodiment.
Figure 13:
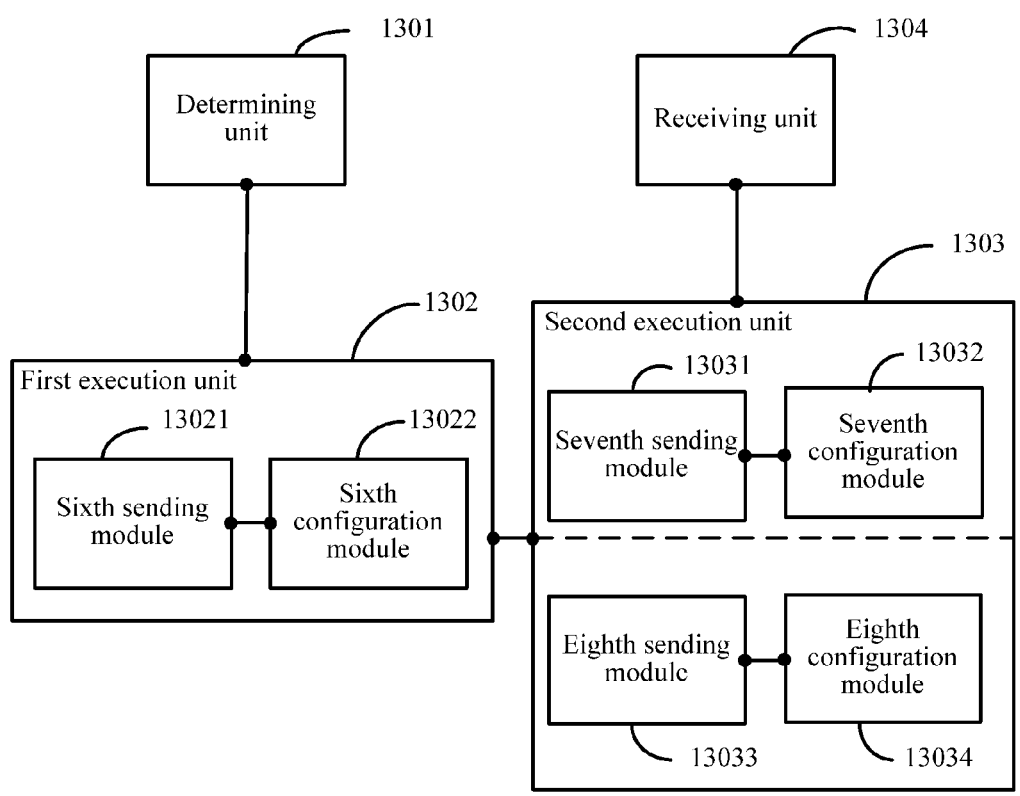
FIG. 13 is a schematic diagram of another embodiment of an access network device in an embodiment.
Figure 14:
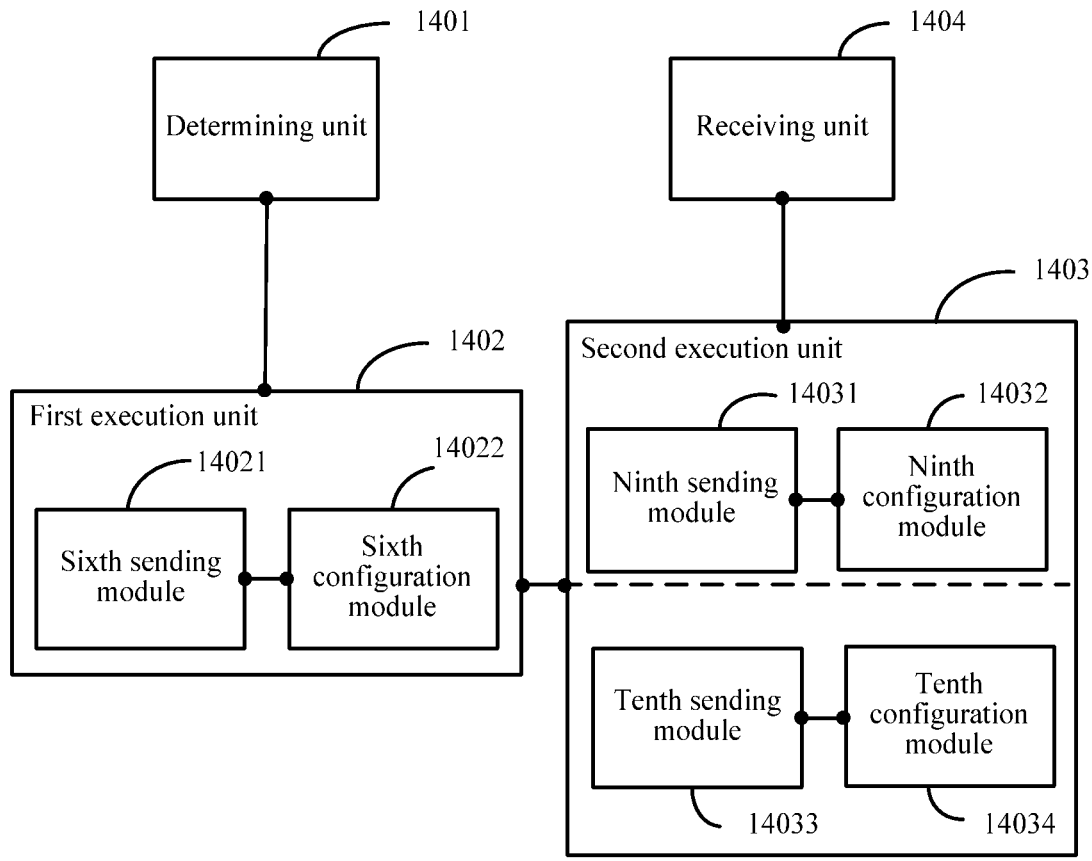
FIG. 14 is a schematic diagram of another embodiment of an access network device in an embodiment.

For ease of understanding, the following describes an access network device in an embodiment by using a specific example. Referring to FIG. 10, another embodiment of the access network device in this embodiment includes: a determining unit 1001, a first execution unit 1002, a second execution unit 1003, and a receiving unit 1004.

The determining unit 1001 is configured to determine, according to a terminal service, network load, or network channel quality, whether to configure the local area network for the terminal, and if it is determined to configure the local area network for the terminal, trigger the first execution unit 1002 to execute a sending operation.

The first execution unit 1002 is configured to send a local area network configuration message to a terminal and configure a local area network for the terminal according to the local area network configuration message.

The second execution unit 1003 is configured to send a bearer configuration message to the terminal and configure a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

The receiving unit 1004 is configured to receive an acknowledge frame sent by the terminal, to give a feedback that the terminal successfully receives the downlink data.

In this embodiment, first, a determining unit 1001 determines, according to a terminal service, network load, or network channel quality, whether to configure a local area network for a terminal; and in this way, it can be determined, according to a situation about a result of the determining, whether it is required to configure the local area network, so that an access network device is prevented from blindly configuring the local area network. Then, a first execution unit 1002 sends a local area network configuration message to the terminal and configures the local area network for the terminal according to the local area network configuration message; a second execution unit 1003 sends a bearer configuration message to the terminal and configures a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data; in this way, the terminal is prevented from receiving downlink data and sending uplink data simultaneously in the local area network, thereby reducing a contention conflict probability and improving network transmission efficiency.

For ease of better understanding the foregoing embodiment, the following describes a data interaction manner in an access network device by means of interaction between modules and units of the access network device in a wireless environment when a local area network configuration message includes a downlink-only data reception indication. Further referring to FIG. 11, the access network device includes: a determining unit 1101, a first execution unit 1102, a second execution unit 1103, and a receiving unit 1104.

The first execution unit 1102 includes a first sending module 11021 and a first configuration module 11022.

The second execution unit 1103 includes a second sending module 11031 and a second configuration module 11032, or a third sending module 11033 and a third configuration module 11034.

The determining unit 1101 determines, according to a terminal service, network load, or network channel quality, whether to configure a WLAN network for a terminal, and if it is required to configure the WLAN network, informs the first sending module 11021 of a result of the determining.

The first sending module 11021 sends an assisted cell addition message or an assisted cell modification message to the terminal according to the determining result of the determining unit, where the assisted cell addition message or the assisted cell modification message includes a downlink-only WIFI indication, and then sends the assisted cell addition message or the assisted cell modification message to the first configuration module 11022, where the assisted cell addition message or the assisted cell modification message includes the downlink-only WIFI indication.

The first configuration module 11022 adds a first WLAN network for the terminal according to the received assisted cell addition message, or modifies a second WLAN network for the terminal according to the received assisted cell modification message, where the downlink-only WIFI indication indicates that the first WLAN network or the second WLAN network is downlink-only, so that the terminal receives, in the first WLAN network or the second WLAN network, downlink data and prohibits sending uplink data; and sends, to the second sending module 11031 and the second configuration module 11032, a message indicating addition completion of the first WLAN network, or sends, to the third sending module 11033 and the third configuration module 11034, a message indicating modification completion of the second WLAN network.

When receiving the message indicating addition completion of the first WLAN network, the second sending module 11031 sends a dedicated radio bearer configuration message to the terminal.

The second configuration module 11032 configures at least one first dedicated radio bearer for the terminal according to the dedicated radio bearer configuration message, where the first dedicated radio bearer is associated with the first WLAN network, and the dedicated radio bearer configuration message includes an identifier of the first WLAN network associated with the first dedicated radio bearer. In this way, the terminal can receive, in the downlink-only first WLAN network according to the assisted cell addition message including the downlink-only WIFI indication and the identifier of the first WLAN network associated with the first dedicated radio bearer, downlink data of the first dedicated radio bearer and prohibit sending uplink data of the first dedicated radio bearer.

When receiving the message indicating modification completion of the second WLAN network, the third sending module 11033 sends a dedicated radio bearer configuration message to the terminal.

When receiving the message indicating modification completion of the second WLAN network, the third configuration module 11034 configured at least one second dedicated radio bearer for the terminal, where the second dedicated radio bearer is associated with the second WLAN, and the dedicated radio bearer configuration message includes an identifier of the second WLAN network associated with the second dedicated radio bearer. In this way, the terminal can receive, in the downlink-only second WLAN network according to the assisted cell modification message including the downlink-only WIFI indication and the identifier of the second WLAN network associated with the second dedicated radio bearer, downlink data of the second dedicated radio bearer and prohibit sending uplink data of the second dedicated radio bearer.

The receiving module 1104 receives an ACK sent by the terminal, to give a feedback that the terminal successfully receives the downlink data.

In this embodiment, a determining unit 1101 determines, according to a terminal service, network load, or network channel quality, whether to configure a local area network for a terminal, and in this way, it can be determined, according to a situation about a result of the determining, whether it is required to configure the local area network; then, a first sending module 11021 sends, to the terminal, an assisted cell addition message including a downlink-only WIFI indication, and then a first configuration module 11022 adds a first WLAN network for the terminal according to the assisted cell addition message, and a second sending module 11031 sends a dedicated radio bearer configuration message to the terminal; when the first configuration module 11022 adds the first WLAN network, a second configuration module 11032 configures at least one first dedicated radio bearer for the terminal according to the dedicated radio bearer configuration message, so that the terminal receives, in a downlink-only first WLAN network according to an identifier that is included in the DRB configuration message and of the first WLAN network associated with the first dedicated radio bearer and according to the downlink-only WIFI indication included in the assisted cell addition message, downlink data of the first dedicated radio bearer and prohibits sending uplink data of the first dedicated radio bearer; in this way, the terminal is prevented from receiving downlink data and sending uplink data simultaneously in a WLAN network, thereby reducing a contention conflict probability and improving network transmission efficiency.

In this embodiment, a determining unit 1101 determines, according to a terminal service, network load, or network channel quality, whether to configure a local area network for a terminal, and in this way, it can be determined, according to a situation about a result of the determining, whether it is required to configure the local area network; then, a first sending module 11021 sends, to the terminal, an assisted cell modification message including a downlink-only WIFI indication, and then a first configuration module 11022 modifies a second WLAN network for the terminal according to the assisted cell modification message, and a third sending module 11033 sends a dedicated radio bearer configuration message to the terminal; when the first configuration module 11022 adds the second WLAN network, a third configuration module 11034 configures at least one second dedicated radio bearer for the terminal according to the DRB configuration message, so that the terminal receives, in a downlink-only second WLAN network according to an identifier that is included in the DRB configuration message and of the second WLAN network associated with the second dedicated radio bearer and according to the downlink-only WIFI indication included in the assisted cell addition message, downlink data of the second dedicated radio bearer and prohibits sending uplink data of the second dedicated radio bearer; in this way, the terminal is prevented from receiving downlink data and sending uplink data simultaneously in a WLAN network, thereby reducing a contention conflict probability and improving network transmission efficiency.

The following describes a data interaction manner in an access network device by means of interaction between modules and units of the access network device in a wireless environment when a local area network configuration message includes a downlink-only data reception indication and a WLAN network is used as an assisted cell. Further referring to FIG. 12, the access network device includes: a determining unit 1201, a first execution unit 1202, a second execution unit 1203, and a receiving unit 1204.

The first execution unit 1202 includes a first sending module 12021 and a first configuration module 12022.

The second execution unit 1203 includes a fourth sending module 12031 and a fourth configuration module 12032, or a fifth sending module 12033 and a fifth configuration module 12034.

The determining unit 1201 determines, according to a terminal service, network load, or network channel quality, whether to configure a WLAN network for a terminal, and if it is required to configure the WLAN network, informs the first sending module 12021 of a result of the determining.

The first sending module 12021 sends an assisted cell addition message or an assisted cell modification message to the terminal according to the determining result of the determining unit, where the assisted cell addition message or the assisted cell modification message includes a downlink-only WIFI indication, and then sends the assisted cell addition message or the assisted cell modification message to the first configuration module 12022, where the assisted cell addition message or the assisted cell modification message includes the downlink-only WIFI indication.

The first configuration module 12022 adds a first WLAN network for the terminal according to the received assisted cell addition message including the downlink-only WIFI indication, or modifies a second WLAN network for the terminal according to the received assisted cell modification message including the downlink-only WIFI indication, where the downlink-only WIFI indication indicates that the first WLAN network or the second WLAN network is downlink-only, so that the terminal receives, in the first WLAN network or the second WLAN network, downlink data and prohibits sending uplink data; and sends, to the fourth sending module and the fourth configuration module, a message indicating addition completion of the first WLAN network and a message indicating that the first WLAN is used as a first assisted cell, or sends, to the fifth sending module and the fifth configuration module, a message indicating modification completion of the second WLAN network and a message indicating that the second WLAN is used as a second assisted cell.

After receiving the message indicating addition completion of the first WLAN network, the fourth sending module 12031 sends a DRB configuration message to the terminal and the fourth configuration module 12032.

When receiving the message indicating addition completion of the first WLAN network, the fourth configuration module 12032 configures at least one third dedicated radio bearer for the terminal according to the received DRB configuration message, where the third dedicated radio bearer is associated with the first assisted cell, and the DRB configuration message includes a number indication of an assisted cell associated with the third dedicated radio bearer, where the number indication of the assisted cell indicates that the assisted cell associated with the third dedicated radio bearer is the first assisted cell. In this way, the terminal receives, in the downlink-only first assisted cell according to the assisted cell addition message including the downlink-only WIFI indication and the number indication of the assisted cell associated with the third dedicated radio bearer, downlink data of the third dedicated radio bearer and prohibits sending uplink data of the third dedicated radio bearer.

After receiving the message indicating modification completion of the second WLAN network, the fifth sending module 12033 sends a dedicated radio bearer configuration message to the terminal and the fifth configuration module.

When receiving the message indicating modification completion of the second WLAN network, the fifth configuration module 12034 configures at least one fourth dedicated radio bearer for the terminal according to the dedicated radio bearer configuration message, where the fourth dedicated radio bearer is associated with the second assisted cell, and the DRB configuration message includes a number indication of an assisted cell associated with the fourth dedicated radio bearer, where the number indication of the assisted cell indicates that the assisted cell associated with the fourth dedicated radio bearer is the second assisted cell. In this way, the terminal receives, in the second assisted cell according to the assisted cell modification message including the downlink-only WIFI indication and the number indication of the assisted cell associated with the fourth dedicated radio bearer, downlink data of the fourth dedicated radio bearer and prohibits sending uplink data of the fourth dedicated radio bearer.

The receiving unit 1204 receives an acknowledge frame sent by the terminal, to give a feedback that the terminal successfully receives the downlink data.

In this embodiment, a first sending module 12021 sends, to a terminal, an assisted cell addition message including a downlink-only WIFI indication, and then a first configuration module 12022 adds a first WLAN network for the terminal according to the assisted cell addition message, and a fourth sending module 12031 sends a dedicated radio bearer configuration message to the terminal; when the first configuration module 12022 adds the first WLAN network as a first assisted cell, a fourth configuration module 12032 configures at least one third dedicated radio bearer for the terminal according to the dedicated radio bearer configuration message, so that the terminal receives, in a downlink-only first assisted cell according to a number indication that is included in the DRB configuration message and of the assisted cell associated with the third dedicated radio bearer and according to the downlink-only WIFI indication included in the assisted cell addition message, downlink data of the third dedicated radio bearer and prohibits sending uplink data of the third dedicated radio bearer; in this way, the terminal is prevented from receiving downlink data and sending uplink data simultaneously in a WLAN network, thereby reducing a contention conflict probability and improving network transmission efficiency.

In this embodiment, a first sending module 12021 sends, to a terminal, an assisted cell modification message including a downlink-only WIFI indication, and then a first configuration module 12022 modifies a second WLAN network for the terminal according to the assisted cell modification message, and a fifth sending module 12033 sends a dedicated radio bearer configuration message to the terminal; when the first configuration module modifies the second WLAN network as a second assisted cell, a fifth configuration module 12034 configures at least one fourth dedicated radio bearer for the terminal according to the dedicated radio bearer configuration message, so that the terminal receives, in a downlink-only second assisted cell according to a number indication that is included in the DRB configuration message and of the assisted cell associated with the fourth dedicated radio bearer and according to the downlink-only WIFI indication included in the assisted cell modification message, downlink data of the fourth dedicated radio bearer and prohibits sending uplink data of the fourth dedicated radio bearer; in this way, the terminal is prevented from receiving downlink data and sending uplink data simultaneously in a WLAN network, thereby reducing a contention conflict probability and improving network transmission efficiency.

The following describes a data interaction manner in an access network device by means of interaction between modules and units of the access network device in a wireless environment when a bearer configuration message includes a downlink-only data reception indication. Further referring to FIG. 13, the access network device includes: a determining unit 1301, a first execution unit 1302, a second execution unit 1303, and a receiving unit 1304.

The first execution unit 1302 includes a sixth sending module 13021 and a sixth configuration module 13022.

The second execution unit 1303 includes a seventh sending module 13031 and a seventh configuration module 13032, or an eighth sending module 13033 and an eighth configuration module 13034.

The determining unit 1301 determines, according to a terminal service, network load, or network channel quality, whether to configure a WLAN network for a terminal, and if it is required to configure the WLAN network, informs the sixth sending module 13021 of a result of the determining.

The sixth sending module 13021 sends an assisted cell addition message or an assisted cell modification message to the terminal according to the determining result of the determining unit, where the assisted cell addition message or the assisted cell modification message includes a WIFI indication, and then sends the assisted cell addition message or the assisted cell modification message to the sixth configuration module 13022, where the assisted cell addition message or the assisted cell modification message includes the WIFI indication.

The sixth configuration module 13022 adds a third WLAN network for the terminal according to the received assisted cell addition message including the WIFI indication, or modifies a fourth WLAN network for the terminal according to the received assisted cell modification message including the WIFI indication, where the WIFI indication indicates that an added assisted cell or a modified assisted cell is a WLAN network; and sends, to the seventh sending module 13031 and the seventh configuration module 13032, a message indicating addition completion of the third WLAN network, or sends, to the eighth sending module 13033 and the eighth configuration module 13034, a message indicating modification completion of the fourth WLAN network.

After receiving the message indicating completion of the third WLAN network, the seventh sending module 13031 sends a dedicated radio bearer configuration message to the terminal and the seventh configuration module 13032.

When receiving the message indicating completion of the third WLAN network, the seventh configuration module 13032 configures at least one fifth dedicated radio bearer for the terminal according to the dedicated radio bearer configuration message, where the fifth dedicated radio bearer is associated with the third WLAN network, and the DRB configuration message includes a downlink-only WIFI indication, so as to indicate that the fifth dedicated radio bearer is downlink-only, so that the terminal receives downlink data of the fifth dedicated radio bearer and prohibits sending uplink data of the fifth dedicated radio bearer. The DRB configuration message further includes an identifier of the third WLAN network associated with the fifth dedicated radio bearer, so that the terminal receives, in the third WLAN network according to the downlink-only WIFI indication and the identifier of the third WLAN network, downlink data of the fifth dedicated radio bearer and prohibits sending uplink data of the fifth dedicated radio bearer.

When receiving the message indicating modification completion of the fourth WLAN network, the eighth sending module 13033 sends a dedicated radio bearer configuration message to the terminal and the eighth configuration module 13034.

The eighth configuration module 13034 configures at least one sixth dedicated radio bearer for the terminal according to the DRB configuration message, where the sixth dedicated radio bearer is associated with the fourth WLAN network, and the DRB configuration message includes a downlink-only WIFI indication, so as to indicate that the sixth dedicated radio bearer is downlink-only, so that the terminal receives downlink data of the sixth dedicated radio bearer and prohibits sending uplink data of the sixth dedicated radio bearer; an identifier of the fourth WLAN network associated with the sixth dedicated radio bearer is further included, so that the terminal receives, in the fourth WLAN network according to the downlink-only WIFI indication and the identifier of the fourth WLAN network, downlink data of the sixth dedicated radio bearer and prohibits sending uplink data of the sixth dedicated radio bearer.

The receiving module 1304 receives an ACK sent by the terminal, to give a feedback that the terminal successfully receives the downlink data.

In this embodiment, a sixth sending module 13021 sends, to a terminal, an assisted cell addition message including a WIFI indication, and then a sixth configuration module 13022 adds a third WLAN network for the terminal according to the assisted cell addition message; a seventh sending module 13031 sends, to the terminal, a dedicated radio bearer configuration message including a downlink-only WIFI indication, and when a radio access network device adds the third WLAN network, a seventh configuration module 13032 configures at least one fifth dedicated radio bearer for the terminal according to the dedicated radio bearer configuration message, so that the terminal receives, in the downlink-only third WLAN network according to an identifier that is included in the DRB configuration message and of the third WLAN network associated with the fifth dedicated radio bearer and according to the included downlink-only WIFI indication, downlink data of the fifth dedicated radio bearer and prohibits sending uplink data of the fifth dedicated radio bearer; in this way, the terminal is prevented from receiving downlink data and sending uplink data simultaneously in a WLAN network, thereby reducing a contention conflict probability and improving network transmission efficiency.

In this embodiment, a sixth sending module 13021 sends, to a terminal, an assisted cell modification message including a WIFI indication, and then a sixth configuration module 13022 adds a fourth WLAN network for the terminal according to the assisted cell addition message; an eighth sending module 13033 sends, to the terminal, a dedicated radio bearer configuration message including a downlink-only WIFI indication, and when a radio access network device adds the fourth WLAN network, an eighth configuration module 13034 configures at least one sixth dedicated radio bearer for the terminal according to the dedicated radio bearer configuration message, so that the terminal receives, in the downlink-only fourth WLAN network according to an identifier that is included in the DRB configuration message and of the fourth WLAN network associated with the sixth dedicated radio bearer and according to the included downlink-only WIFI indication, downlink data of the sixth dedicated radio bearer and prohibits sending uplink data of the sixth dedicated radio bearer; in this way, the terminal is prevented from receiving downlink data and sending uplink data simultaneously in a WLAN network, thereby reducing a contention conflict probability and improving network transmission efficiency.

The following describes a data interaction manner in an access network device by means of interaction between modules and units of the access network device in a wireless environment when a bearer configuration message includes a downlink-only data reception indication and a WLAN network is used as an assisted cell. Further referring to FIG. 14, the access network device includes: a determining unit 1401, a first execution unit 1402, a second execution unit 1403, and a receiving unit 1404.

The first execution unit 1402 includes a sixth sending module 14021 and a sixth configuration module 14022.

The second execution unit 1403 includes a ninth sending module 14031 and a ninth configuration module 14032, or a tenth sending module 14033 and a tenth configuration module 14034.

The determining unit 1401 determines, according to a terminal service, network load, or network channel quality, whether to configure a WLAN network for a terminal, and if it is required to configure the WLAN network, informs the sixth sending module 14021 of a result of the determining.

The sixth sending module 14021 sends an assisted cell addition message or an assisted cell modification message to the terminal according to the determining result of the determining unit, where the assisted cell addition message or the assisted cell modification message includes a WIFI indication, and then sends the assisted cell addition message or the assisted cell modification message to the sixth configuration module 14022, where the assisted cell addition message or the assisted cell modification message includes the WIFI indication.

The sixth configuration module 14022 adds a third WLAN network for the terminal according to the received assisted cell addition message including the WIFI indication, or modifies a fourth WLAN network for the terminal according to the received assisted cell modification message including the WIFI indication, where the WIFI indication indicates that an added assisted cell or a modified assisted cell is a WLAN network; and sends, to the ninth sending module 14031 and the ninth configuration module 14032, a message indicating addition completion of the third WLAN network, or sends, to the tenth sending module 14033 and the tenth configuration module 14034, a message indicating modification completion of the fourth WLAN network.

After receiving the message indicating addition completion of the third WLAN network, the ninth sending module 14031 sends a DRB configuration message to the terminal and the ninth configuration module 14032.

When receiving the message indicating addition completion of the third WLAN network, the ninth configuration module 14032 configures at least one seventh dedicated radio bearer for the terminal according to the DRB configuration message, where the seventh dedicated radio bearer is associated with a third assisted cell, and the DRB configuration message includes a downlink-only WIFI indication, so as to indicate that the seventh dedicated radio bearer is downlink-only, so that the terminal receives downlink data of the seventh dedicated radio bearer and prohibits sending uplink data of the seventh dedicated radio bearer; a number indication of an assisted cell associated with the seventh dedicated radio bearer is further included, and the number indication of the assisted cell indicates that the assisted cell associated with the seventh dedicated radio bearer is the third assisted cell, so that the terminal receives, in the third assisted cell according to the downlink-only WIFI indication and the number indication of the assisted cell, downlink data of the seventh dedicated radio bearer and prohibits sending uplink data of the seventh dedicated radio bearer.

After receiving the message indicating modification completion of the fourth WLAN network, the tenth sending module 14033 sends a DRB configuration message to the terminal and the tenth configuration module 14034.

When receiving the message indicating modification completion of the fourth WLAN network, the tenth configuration module 14034 configures at least one eighth dedicated radio bearer for the terminal according to the DRB configuration message, where the eighth dedicated radio bearer is associated with a fourth assisted cell, and the DRB configuration message includes a downlink-only WIFI indication, so as to indicate that the eighth dedicated radio bearer is downlink-only, so that the terminal receives downlink data of the eighth dedicated radio bearer and prohibits sending uplink data of the eighth dedicated radio bearer; a number indication of an assisted cell associated with the eighth dedicated radio bearer is further included, and the number indication of the assisted cell indicates that the assisted cell associated with the eighth dedicated radio bearer is the fourth assisted cell, so that the terminal receives, in the fourth assisted cell according to the downlink-only WIFI indication and the number indication of the assisted cell, downlink data of the eighth dedicated radio bearer and prohibits sending uplink data of the eighth dedicated radio bearer.

The receiving unit 1404 receives an ACK sent by the terminal, to give a feedback that the terminal successfully receives the downlink data.

In this embodiment, a sixth sending module 14021 sends, to a terminal, an assisted cell addition message including a WIFI indication, and then a sixth configuration module 14022 adds a third WLAN network for the terminal according to the assisted cell addition message; a ninth sending module 14031 sends, to the terminal, a DRB configuration message including a downlink-only WIFI indication, and when a radio access network device adds the third WLAN network as a third assisted cell, a ninth configuration module 14032 configures at least one seventh dedicated radio bearer for the terminal according to the dedicated radio bearer configuration message, so that the terminal receives, in the downlink-only third assisted cell according to a number indication that is included in the DRB configuration message and of the assisted cell associated with the seventh dedicated radio bearer and according to the included downlink-only WIFI indication, downlink data of the seventh dedicated radio bearer and prohibits sending uplink data of the seventh dedicated radio bearer; in this way, the terminal is prevented from receiving downlink data and sending uplink data simultaneously in a WLAN network, thereby reducing a contention conflict probability and improving network transmission efficiency.

In this embodiment, a sixth sending module 14021 sends, to a terminal, an assisted cell addition message including a WIFI indication, and then a sixth configuration module 14022 adds a fourth WLAN network for the terminal according to the assisted cell addition message; a tenth sending module 14033 sends, to the terminal, a DRB configuration message including a downlink-only WIFI indication, and when the sixth configuration module adds the fourth WLAN network as an assisted cell, a tenth configuration module 14034 configures at least one eighth dedicated radio bearer for the terminal according to the dedicated radio bearer configuration message, so that the terminal receives, in the downlink-only fourth assisted cell according to a number indication that is included in the DRB configuration message and of the assisted cell associated with the eighth dedicated radio bearer and according to the included downlink-only WIFI indication, downlink data of the eighth dedicated radio bearer and prohibits sending uplink data of the eighth dedicated radio bearer; in this way, the terminal is prevented from receiving downlink data and sending uplink data simultaneously in a WLAN network, thereby reducing a contention conflict probability and improving network transmission efficiency.

Figure 15:
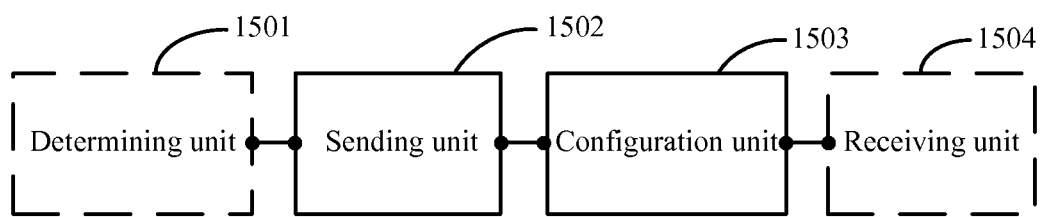
FIG. 15 is a schematic diagram of another embodiment of an access network device in an embodiment.
Figure 16:
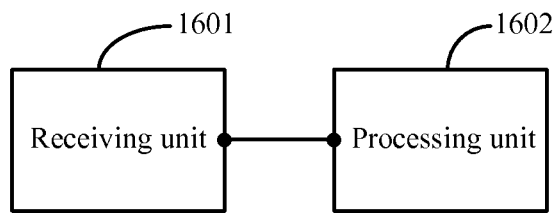
FIG. 16 is a schematic diagram of an embodiment of a terminal in an embodiment.
Figure 17:
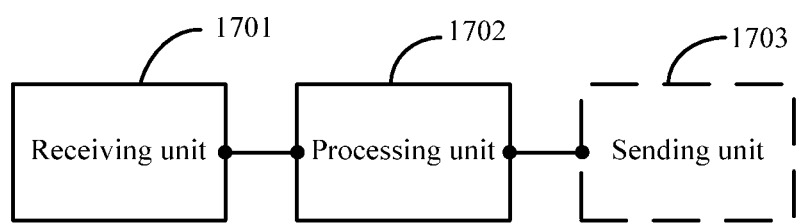
FIG. 17 is a schematic diagram of another embodiment of a terminal in an embodiment.

The following describes an access network device in an embodiment by using a specific example. Referring to FIG. 15, another embodiment of the access network device in this embodiment includes a sending unit 1502 and a configuration unit 1503.

The sending unit 1502 is configured to send a local area network configuration message or a bearer configuration message to a terminal, where the local area network configuration message or the bearer configuration message includes a downlink-only data reception indication.

The configuration unit 1503 is configured to configure a local area network for the terminal according to the local area network configuration message and configure a dedicated bearer for the terminal according to the bearer configuration message, so that the terminal receives, in the local area network according to the downlink-only data reception indication, downlink data of the dedicated bearer and prohibits sending uplink data of the dedicated bearer, where the local area network is associated with the dedicated bearer.

In this embodiment, a determining unit 1501 may be further included, which is configured to determine, according to a terminal service status, a network load status, or a network channel quality status, whether to configure the local area network for the terminal, and if it is determined to configure the local area network for the terminal, trigger the sending unit 1502 to execute a sending operation.

In this embodiment, a receiving unit 1504 may be further included, which is configured to receive an acknowledge frame sent by the terminal, to give a feedback that the terminal successfully receives the downlink data.

Specifically, in this embodiment, a sending unit 1502 sends a local area network configuration message and a bearer configuration message to a terminal, where the local area network configuration message or the bearer configuration message includes a downlink-only data reception indication; a configuration unit 1503 is configured to configure a local area network for the terminal according to the local area network configuration message, and configure a dedicated bearer for the terminal according to the bearer configuration message, so that the terminal receives, in the local area network according to the downlink-only data reception indication, downlink data of the dedicated bearer and prohibits sending uplink data of the dedicated bearer, where the local area network is associated with the dedicated bearer. In this way, the terminal receives, in the configured downlink-only local area network according to the local area network configuration message including the downlink-only data reception indication, downlink data of the configured dedicated bearer and prohibits sending uplink data, or the terminal receives, in the configured local area network according to the bearer configuration message including the downlink-only data reception indication, downlink data of the configured downlink-only dedicated bearer and prohibits sending uplink data; in this way, the terminal is prevented from receiving downlink data and sending uplink data simultaneously in the local area network, thereby reducing a contention conflict probability and improving network transmission efficiency.

In this embodiment, for a specific operation of enabling, by the access network device, the terminal to receive, in the local area network according to the downlink-only data reception indication, downlink data of the dedicated bearer and prohibit sending uplink data of the dedicated bearer, and other similar steps or definitions, reference may be made to description in the embodiments shown in FIG. 1 to FIG. 14, and the details are not described herein again.

The following describes a terminal for executing the service data offloading method according to an embodiment. For a basic logical structure thereof, refer to FIG. 16, and an embodiment of the terminal in this embodiment includes a receiving unit 1601 and a processing unit 1602.

The receiving unit 1601 is configured to receive a local area network configuration message sent by an access network device, to learn a local area network configured by the access network device, and receive a bearer configuration message to learn a dedicated bearer configured by the access network device, where the local area network is associated with the dedicated bearer.

The processing unit 1602 is configured to receive, in the local area network associated with the dedicated bearer, according to the downlink-only data reception indication included in the local area network configuration message or in the bearer configuration message, downlink data of the dedicated bearer and prohibit sending uplink data of the dedicated bearer.

In this embodiment, a receiving unit 1601 receives a local area network configuration message sent by an access network device, and learns a local area network configured by the access network device; and receives a bearer configuration message sent by the access network device, and learns a dedicated bearer configured by the access network device, where the local area network is associated with the dedicated bearer, and the local area network configuration message or the bearer configuration message includes a downlink-only data reception indication; a processing unit 1602 receives, in the local area network associated with the dedicated bearer, according to the downlink-only data reception indication included in the local area network configuration message or in the bearer configuration message, downlink data of the dedicated bearer and prohibits sending uplink data of the dedicated bearer. In this way, a terminal is prevented from receiving downlink data and sending uplink data simultaneously in the local area network, thereby reducing a contention conflict probability and improving network transmission efficiency.

For ease of understanding, the following describes a data interaction manner in a terminal by means of interaction between modules and units of the terminal. Further referring to FIG. 17, the terminal includes: a receiving unit 1701, a processing unit 1702, and a sending unit 1703.

The receiving unit 1701 receives a local area network configuration message sent by an access network device, to learn a local area network configured by the access network device; receives a bearer configuration message, to learn a dedicated bearer configured by the access network device; and sends the local area network configuration message and the bearer configuration message to the processing unit 1702, where the local area network is associated with the dedicated bearer, and the local area network configuration message or the bearer configuration message includes a downlink-only data reception indication.

The processing unit 1702 receives, in the local area network associated with the dedicated bearer, according to the downlink-only data reception indication included in the local area network configuration message or in the bearer configuration message, downlink data of the dedicated bearer and prohibits sending uplink data of the dedicated bearer; and informs the sending unit 1703 that the downlink data is successfully received.

When the processing unit 1702 successfully receives the downlink data, the sending unit 1703 sends, to the access network device, an acknowledge frame indicating a downlink data reception success.

In this embodiment, a receiving unit 1701 receives a local area network configuration message sent by an access network device, and learns a local area network configured by the access network device; and receives a bearer configuration message sent by the access network device, and learns a dedicated bearer configured by the access network device, where the local area network is associated with the dedicated bearer, and the local area network configuration message or the bearer configuration message includes a downlink-only data reception indication; a processing unit 1702 receives, in the local area network associated with the dedicated bearer, according to the downlink-only data reception indication included in the local area network configuration message or in the bearer configuration message, downlink data of the dedicated bearer and prohibits sending uplink data of the dedicated bearer; and a sending unit 1703 sends, to the access network device, an acknowledge frame indicating a downlink data reception success. In this way, a terminal is prevented from receiving downlink data and sending uplink data simultaneously in the local area network, thereby reducing a contention conflict probability and improving network transmission efficiency.

It should be noted that the service data offloading method in a wireless environment in this embodiment may be further described in this embodiment.

Figure 18:
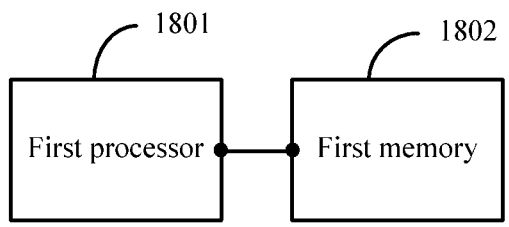
FIG. 18 is a schematic diagram of another embodiment of an access network device in an embodiment.

The following further describes an access network device in an embodiment. Referring to FIG. 18, another embodiment of an access network device in this embodiment includes: a first processor 1801 and a first memory 1802 that is configured to store and buffer code.

The first processor 1801 executes the following process sending a local area network configuration message and a bearer configuration message to a terminal, configuring a local area network for the terminal according to the local area network configuration message, and configuring a dedicated bearer for the terminal according to the bearer configuration message, where the local area network is associated with the dedicated bearer, and the local area network configuration message or the bearer configuration message includes a downlink-only data reception indication, so that the terminal receives, in the local area network according to the downlink-only data reception indication, downlink data of the dedicated bearer and prohibits sending uplink data of the dedicated bearer.

Figure 19:
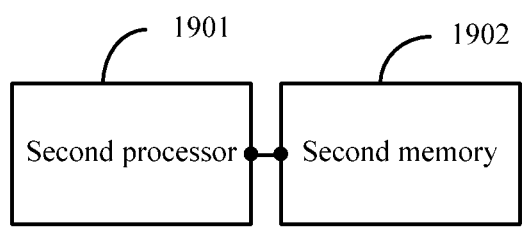
FIG. 19 is a schematic diagram of another embodiment of a terminal in an embodiment.

The following further describes a terminal in an embodiment. Referring to FIG. 19, another embodiment of a terminal in this embodiment includes a second processor 1901 and a second memory 1902 that is configured to store and buffer code.

The second processor 1901 executes the following process. The process includes receiving a local area network configuration message sent by an access network device and learning a local area network configured by the access network device, and receiving a bearer configuration message sent by the access network device and learning a dedicated bearer configured by the access network device, where the local area network is associated with the dedicated bearer; and receiving, in the local area network associated with the dedicated bearer, according to a downlink-only data reception indication included in the local area network configuration message or in the bearer configuration message, downlink data of the dedicated bearer and prohibiting sending uplink data of the dedicated bearer.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method, comprising:
    sending, by a base station in a radio access network, a local area network configuration message and a bearer configuration message to a terminal;
    configuring, by the base station, a local area network for the terminal according to the local area network configuration message; and
    configuring, by the base station, a radio bearer for the terminal according to the bearer configuration message, wherein the local area network is associated with the radio bearer;
    wherein the bearer configuration message comprises a downlink-only data reception indication, to indicate to the terminal to receive, in the local area network, downlink data of the radio bearer, and prohibit, in the local area network, sending uplink data of the radio bearer; and
    wherein the radio bearer is configured to transmit downlink data of the radio bearer to the terminal using the local area network and transmit uplink data from the terminal using the radio access network, and wherein the downlink data transmitted to the terminal using the local area network is transmitted from the base station to the terminal.

2. The method according to claim 1, wherein sending the local area network configuration message and configuring the local area network for the terminal comprises:
    sending, by the base station, an assisted cell addition message, wherein the assisted cell addition message comprises a wireless fidelity (WIFI) indication; and
    adding, by the base station, a wireless local area network (WLAN) network for the terminal according to the assisted cell addition message comprising the WIFI indication;
    wherein the WIFI indication indicates that an added assisted cell is a WLAN network.

3. The method according to claim 2, wherein sending the bearer configuration message and configuring the radio bearer for the terminal comprises:
    sending, by the base station, a dedicated radio bearer configuration message to the terminal; and
    configuring, by the base station, a dedicated radio bearer for the terminal according to the dedicated radio bearer configuration message;
    wherein the dedicated radio bearer configuration message comprises an identifier of the WLAN network and a downlink-only WIFI indication, so that the terminal only receives downlink data of the dedicated radio bearer in the WLAN network according to the downlink-only WIFI indication and the identifier of the WLAN network; and
    wherein the downlink-only WIFI indication indicates that the dedicated radio bearer is downlink-only, so that the terminal receives the downlink data of the dedicated radio bearer and prohibits sending uplink data of the dedicated radio bearer.

4. The method according to claim 1, wherein sending the local area network configuration message and configuring the local area network for the terminal comprises:
    sending, by the base station, an assisted cell modification message to the terminal, wherein the assisted cell modification message comprises a wireless fidelity (WIFI) indication; and
    modifying a wireless local area network (WLAN) network for the terminal according to the assisted cell modification message comprising the WIFI indication;
    wherein the WIFI indication indicates that a modified assisted cell is a WLAN network.

5. The method according to claim 4, wherein sending the bearer configuration message and configuring the radio bearer for the terminal comprises:
    sending, by the base station, a dedicated radio bearer configuration message to the terminal; and
    configuring, by the base station, a dedicated radio bearer for the terminal according to the dedicated radio bearer configuration message;
    wherein the dedicated radio bearer configuration message comprises an identifier of the WLAN network and a downlink-only WIFI indication, so that the terminal only receives downlink data of the dedicated radio bearer in the WLAN network according to the downlink-only WIFI indication and the identifier of the WLAN network; and
    wherein the downlink-only WIFI indication indicates that the dedicated radio bearer is downlink-only, so that the terminal receives the downlink data of the dedicated radio bearer and prohibits sending uplink data of the dedicated radio bearer.

6. A service data offloading method, comprising:
    receiving, by a terminal, a local area network configuration message sent by a base station in a radio access network access;
    receiving, by the terminal, a bearer configuration message sent by the base station, and learning, by the terminal, a radio bearer configured by the base station, wherein a local area network is associated with the radio bearer, wherein the bearer configuration message comprises a downlink-only data reception indication to indicate to the terminal to receive downlink data of the radio bearer using the local area network and prohibit sending uplink data of the radio bearer using the local area network, and wherein the downlink data transmitted to the terminal using the local area network is transmitted from the base station to the terminal;

receiving, by the terminal according to the downlink-only data reception indication comprised in the bearer configuration message, downlink data of the radio bearer in the local area network; and prohibiting sending uplink data of the radio bearer in the local area network associated with the radio bearer;

wherein the radio bearer is configured to transmit downlink data of the radio bearer to the terminal using the local area network and transmit uplink data from the terminal using the radio access network.

7. The method according to claim 6, wherein the local area network is a wireless local area network (WLAN) network.

8. The method according to claim 6, the method further comprising:

sending, by the terminal to the base station, an acknowledge frame indicating a downlink data reception success.

9. A device, comprising:

a transmitter, configured to transmit a local area network configuration message and a bearer configuration message to a terminal using a radio access network;

a processor configured to:
 configure a local area network for the terminal according to the local area network configuration message; and
 configure a radio bearer for the terminal according to the bearer configuration message;

wherein the local area network is associated with the radio bearer; and wherein the bearer configuration message comprises a downlink-only data reception indication to indicate to the terminal to receive downlink data of the radio bearer in the local area network and prohibit sending uplink data of the radio bearer in the local area network; and wherein the radio bearer is configured to transmit downlink data of the radio bearer to the terminal using the local area network and transmit uplink data from the terminal using the radio access network, and wherein the downlink data that is transmitted to the terminal using the local area network is transmitted from the device to the terminal.

10. The device according to claim 9, wherein:

the transmitter is further configured to send an assisted cell addition message or an assisted cell modification message to the terminal, wherein the assisted cell addition message or the assisted cell modification message comprises a wireless fidelity (WIFI) indication;

the processor is further configured to add a first WLAN network for the terminal according to the assisted cell addition message comprising the WIFI indication, or modify the first WLAN network for the terminal according to the assisted cell modification message comprising the WIFI indication; and the WIFI indication indicates that an added assisted cell or a modified assisted cell is a WLAN network.

11. The device according to claim 10, wherein:

the transmitter is further configured to send a dedicated radio bearer configuration message to the terminal;

the processor is further configured to configure a dedicated radio bearer for the terminal according to the dedicated radio bearer configuration message;

the dedicated radio bearer configuration message comprises an identifier of the first WLAN network associated with the dedicated radio bearer and a downlink-only WIFI indication for the terminal only to receive downlink data of the dedicated radio bearer in the first WLAN network according to the downlink-only WIFI indication and the identifier of the first WLAN network; and the downlink-only WIFI indication indicates that the dedicated radio bearer is downlink-only for the terminal to receive the downlink data of the dedicated radio bearer and prohibit sending uplink data of the dedicated radio bearer.

12. A terminal, comprising:

a receiver configured to:
 receive a local area network configuration message sent from a base station in a radio access network; and
 receive a bearer configuration message to learn a radio bearer configured by the base station, wherein a local area network is associated with the radio bearer, and wherein the bearer configuration message comprises a downlink-only data reception indication to indicate to the terminal to receive downlink data of the radio bearer using the local area network and prohibit sending uplink data of the radio bearer using the local area network; and a processor configured to:
 receive, in the local area network associated with the radio bearer according to the downlink-only data reception indication comprised in the bearer configuration message, downlink data of the radio bearer in the local area network, wherein the downlink data transmitted using the local area network is transmitted from the base station to the terminal; and
 prohibit sending uplink data of the radio bearer in the local area network associated with the radio bearer;

wherein the radio bearer is configured to transmit downlink data of the radio bearer to the terminal using the local area network and transmit uplink data from the terminal using the radio access network.

13. The terminal according to claim 12, wherein the local area network is a wireless local area network (WLAN) network.

14. The terminal according to claim 12, wherein the terminal further comprises:

a transmitter configured to transmit, to the base station, an acknowledge frame indicating a downlink data reception success.

* * * * *